United States Patent
Walsh et al.

(10) Patent No.: US 12,271,446 B1
(45) Date of Patent: Apr. 8, 2025

(54) USING MACHINE LEARNING AND FREE TEXT DATA TO DETECT AND REPORT EVENTS ASSOCIATED WITH USE OF SOFTWARE APPLICATIONS

(71) Applicant: Click Therapeutics, Inc., New York, NY (US)

(72) Inventors: John Walsh, New Rochelle, NY (US); William Morse, Brooklyn, NY (US)

(73) Assignee: CLICK THERAPEUTICS, INC., New York, NY (US)

( * ) Notice: Subject to any disclaimer, the term of this patent is extended or adjusted under 35 U.S.C. 154(b) by 0 days.

(21) Appl. No.: 18/806,230

(22) Filed: Aug. 15, 2024

(51) Int. Cl.
| | |
|---|---|
| *G06F 18/24* | (2023.01) |
| *G06F 16/242* | (2019.01) |
| *G06F 18/2415* | (2023.01) |
| *G06N 3/047* | (2023.01) |
| *G06N 3/0475* | (2023.01) |
| *G06N 20/00* | (2019.01) |

(52) U.S. Cl.
CPC ............ *G06F 18/24* (2023.01); *G06N 3/047* (2023.01); *G06N 3/0475* (2023.01); *G06N 20/00* (2019.01); *G06F 16/243* (2019.01); *G06F 18/2415* (2023.01)

(58) Field of Classification Search
CPC ............ G06N 3/02; G06N 3/04; G06N 3/047; G06N 3/0475; G06N 20/00; G06N 20/10; G06N 20/20; G06F 16/243; G06F 18/24; G06F 18/2415
See application file for complete search history.

(56) References Cited

U.S. PATENT DOCUMENTS

| | | | |
|---|---|---|---|
| 2018/0260718 A1* | 9/2018 | Biswas | ............... G06F 40/20 |
| 2019/0258498 A1* | 8/2019 | Chandan | ............... G06F 40/20 |

* cited by examiner

*Primary Examiner* — Shane D Woolwine
(74) *Attorney, Agent, or Firm* — Foley & Lardner LLP

(57) ABSTRACT

Aspects of the present disclosure are directed to systems, methods, and computer readable media for executing actions for events associated with use of applications. A computing system can identify free text associated with an application to be evaluated for at least one of a plurality of events associated with a use of the application. The computing system can apply the free text to a machine learning (ML) architecture. The computing system can determine, based on applying the free text to the ML architecture, a value indicating a likelihood of occurrence of an event associated with the use of the application. The computing system can provide to a generative ML model, a model input based on the free text and the value, to obtain data for an electronic document characterizing the event. The computing system can execute an action using the data for the electronic document.

30 Claims, 8 Drawing Sheets

USING MACHINE LEARNING AND FREE TEXT DATA TO DETECT AND REPORT EVENTS ASSOCIATED WITH USE OF SOFTWARE APPLICATIONS

BACKGROUND

Unexpected or undesirable events can occur during the use of a software application. These events can be attributable to a wide number of causes. For example, individuals not familiar with software technology not being able to log into their account correctly. These events negatively impact overall performance of the application. The events also impair the user experience with the application, leading to lower interaction rates. Constant obstacles to the full and proper usage of the application can also make the user dissatisfied and abandon use of the application. In addition to events affecting the performance of the application, there are events that affect the medical health of the user when the software application is a digital therapeutic. If the cause of these event is left unaddressed, the individual user's symptom or underlying medical condition can remain unaddressed or untreated.

For medical contexts, there are monitoring and reporting requirements in connection with certain types of events described as adverse events. The requirements are imposed by various entities, such as regulatory agencies (e.g., United States Food & Drug Administration (FDA)), clinical institutions, and device manufacturers, among others. With these requirements, companies are obliged to keep records and report certain types of events. The monitoring and reporting of adverse events encountered with digital therapeutics are unique and different from those faced with traditional pharmaceutical drugs. Because digital therapeutics are software applications used to address a medical disease, condition, or symptom of a user, the adverse events can include software-related issues, such as a patient using a migraine digital therapeutic and not being able to log into their account and describing this experience as making their migraine feel worse, when the unfavorable symptom is not a side effect of the treatment but rather user frustration due to confusion in operating the software technology.

Unlike pharmaceuticals, it is difficult to monitor let alone report such events. For one, the user of the digital therapeutic is not confined to a particular location (e.g., a hospital or clinical site) but rather is able to access the treatment from outside these environments, such as at their home or as part of their daily living routines. The ability to access the digital therapeutic outside particular locations is one of the great benefits that a digital therapeutic has over traditional medical treatment. Yet as such, it is much more difficult to ascertain whether the user is experiencing an adverse event, making it difficult to track and monitor any adverse events experienced by the user. With pharmaceuticals, a clinician can examine the individual for any adverse events (e.g., side effects or harm) when the user is physically present with the clinician.

One approach to detect events may be to rely on users submitting feedback (e.g., calls to a customer service agent, emails to a customer service address, chats with a customer service chatbot, voicemails left on a customer service line during afterhours) directly to an administrator of the application. The administrator would then laboriously review the submissions to decide whether the user indeed experienced an event. However, the process for reviewing incoming submissions is manual, time-consuming, and cannot scale very well, especially if there are a large volume of users using the application and those submissions are coming from and recorded in multiple different sources.

SUMMARY

Presented herein are systems and methods for using machine learning to detect and handle events as described in feedback from users about their experience with applications, such as digital therapeutic applications. There are several advantages of leveraging machine learning techniques detailed herein to detect events in messages associated with the use of the application. In particular, the messages from users are in free text and recorded in a wide variety of channels, such as email, messages, call center transcripts, chat bot messages, voicemail during after hours, or in-app inputs, among others. The machine learning models described herein can analyze this large volume of free text quickly, classify the events by type and severity, and then select an action to resolve the event.

In the context of digital therapeutics applications, the detection of the events using the machine learning techniques leads to more effective delivery of therapy intervention to its users. By reducing the likelihood of obstacles to the user receiving treatment caused by such events, the machine learning architecture described herein has the ability to address events as they are detected in near-real time to allow for prompt notification to administrators, quicker resolutions of the events, and speedier delivery of the medical treatment to the user. Furthermore, the reduction of such events enhances the user experience, thereby reducing frustration and increasing user satisfaction with the digital therapeutic application. This results in higher adherence rates, leading to better health outcomes and more successful digital therapeutic interventions.

In addition, the machine learning techniques allow for better and consistent compliance with the monitoring and reporting requirements for events occurring during the use of the digital therapeutic application. Once an event is detected, information about the event including the initial free text is fed to a generative model to generate an analytics report on the event. The analytics report contains a classification of the severity of the event and a natural language description of potential remedies. The analytics report generated by the generative model and the free text from the user can be stored and maintained for record and monitoring purposes. If the event is identified as a reportable type (e.g., a serious adverse event), the analytics report itself can be used as the submission materials to the relevant entities to satisfy reporting requirements.

As a result, the amount of time between the receipt of the message about the application and the detection of any events associated with the use of the application are drastically reduced. A service using the machine learning architecture as detailed herein can constantly monitor all incoming messages containing the free text, and automatically generate documentation of the events using natural language in near real-time. This is particularly beneficial for an event occurring during afterhours when a live customer service agent may not be available. The analytics report provides a synopsis of the event associated with the use of the application as well as recommendation of actions to address the causes contributing to the occurrence of the events. This reduces or eliminates the involvement of manual monitoring by the application administrator, thereby enhancing efficiency and accuracy in identifying potential risks and speeding up response times to deploy countermeasures to address these events. In this manner, any events that are detected from the free text messages are able to be handled by the service from the initial identification of the potential issue to the end resolution of the underlying causes in a seamless fashion with little to no human input.

Aspects of the present disclosure are directed to systems, methods, and computer readable media for executing actions for events associated with use of applications. The one or more processors can identify free text associated with an application to be evaluated for at least one of a plurality of events associated with a use of the application. The one or more processors can apply the free text to a machine learning (ML) architecture. The ML architecture can be trained using a plurality of sample texts indicative of at least one of the plurality of events associated with the use of the application. The one or more processors can determine based on applying the free text to the ML architecture, a value indicating a likelihood of occurrence of an event associated with the use of the application. The one or more processors can provide to a generative ML model, a model input based on the free text and the value, to obtain data for an electronic document characterizing the event associated with the use of the application. The one or more processors can execute an action using the data for the electronic document.

In some embodiments, the one or more processors can apply the free text to the ML architecture comprising a natural language processing (NLP) model configured to access a plurality of information resources associated with the application. The one or more processors can identify, based on the applying the free text to the ML architecture, an information resource of the plurality of information resources associated with the application using at least a portion of the free text. The one or more processors can provide the model input based on an information resource identified from the plurality of information resources associated with the application using at least a portion of the free text, to the generative ML model to obtain the data.

In some embodiments the ML architecture can include a classifier model established using the plurality of sample texts. Each of the plurality of sample texts can be labeled with a respective indication of a presence or an absence of a respective event associated with the use of the application. The plurality of events associated with the use of the application comprises at least one of an adverse event, a serious adverse event, an incident, a serious incident, a software bug, a user complaint, or a usability issue. In some embodiments, the one or more processors can classify, based on applying the free text to the ML architecture, the event as at least one of an adverse event, a serious adverse event, an incident, a serious incident, a software bug, a user complaint, or a usability issue. In some embodiments, the one or more processors can determine that the event satisfies a reporting criterion to provide at least a portion of the electronic document to a remote device. The one or more processors can send, to the remote device, at least the portion of the electronic document in response to determining that the event satisfies the reporting criterion.

In some embodiments, the generative ML model can be trained using at least one corpus comprising a sample input and a sample output. The sample input can identify at least one of (i) a sample information resource associated with at least one event of the plurality of events or (ii) a sample value indicating likelihood of the at least one event, and wherein the sample output identifies at least one of: (i) a diagnosis of the at least one event, (ii) a sample action for the at least one event, or (iii) analytics for the at least one event. In some embodiments, the one or more processors can select the action from a plurality of actions in accordance with the data. The plurality of actions can include at least one of: (i) terminating use of the application on a user device associated with the user, (ii) restricting an operation of the application associated with the event, (iii) sending a notification to the user device for presentation to the user, (iv) providing the electronic document to an administrator device, or (v) storing the electronic document.

In some embodiments, the one or more processors can determine that the value indicating the likelihood of the event satisfies a threshold. The one or more processors can provide the model input to the generative ML model, responsive to determining the value satisfies the threshold. In some embodiments, the one or more processors can receive, via an interface, feedback identifying an updated value indicating an updated likelihood of the event associated with the application. The one or more processors can update at least one of a plurality of weights of the ML architecture based on the feedback. In some embodiments, the one or more processors can generate the model input to include context information based on the free text and the value, in accordance with a template.

In some embodiments, the one or more processors can obtain the free text associated with the application from at least one of: (i) an email, (ii) a text message, (iii) a voice transcript, (iv) a chatbot message, (v) an electronic post, or (vi) a communication platform message. In some embodiments, the one or more processors can establish an event listener on the application to monitor for the free text generated by a user of the application. The one or more processors can obtain, via an application programming interface (API) of the event listener of the application, the free text.

In some embodiments, the one or more processors can generate a data element identifying (i) an information resource associated with the application, (ii) the value, and (iii) a timestamp associated with a message including the free text. In some embodiments, the one or more processors can generate, based on providing the model input to the generative ML model, the electronic document including one or more recommendations for the event. In some embodiments, the application includes a digital therapeutic application to address a condition. The application can include a digital therapeutic application. The user can be administered with an effective amount of a medication to address a condition, concurrently with use of the digital therapeutic application.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
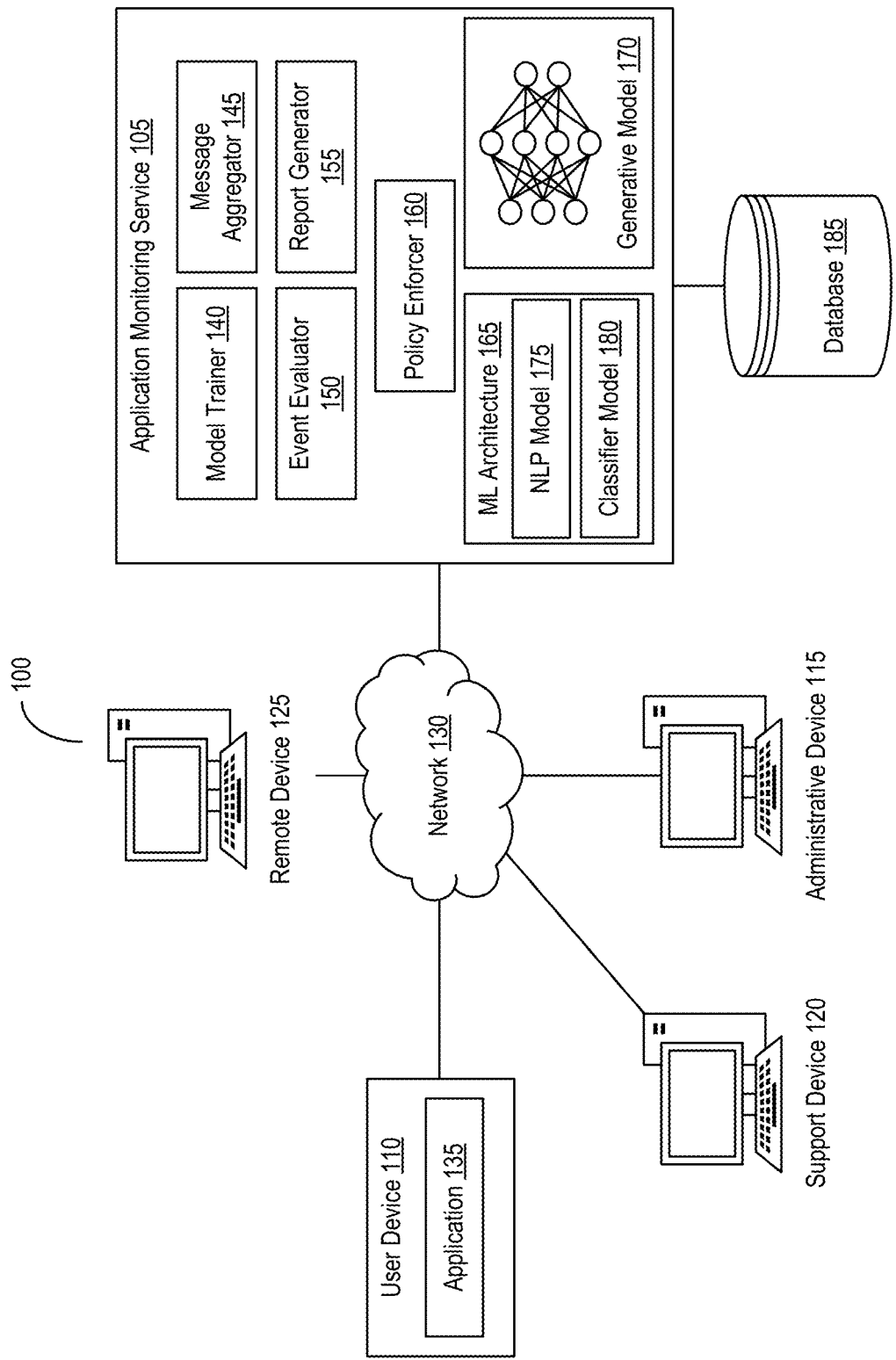
FIG. 1 depicts a block diagram of a system for executing actions for events associated with use of applications detected from free text data, in accordance with an illustrative embodiment.

For purposes of reading the description of the various embodiments below, the following enumeration of the sections of the specification and their respective contents may be helpful:

Section A describes systems and methods for executing actions for events associated with use of applications detected from free text data; and Section B describes a network and computing environment which may be useful for practicing embodiments described herein.

A. Systems and Methods for Executing Actions for Events Associated with Use of Applications Detected from Free Text Data Presented herein are systems and methods for executing actions for events associated with use of applications detected from free text data. Events may correspond to unexpected or undesirable events occurring in conjunction with the use of an application. Events can negatively impact overall performance of the application, a computing device running the application, and even remote servers interfacing with the application. For example, a glitch with a particular function of the application may lead to excessive consumption of resources (e.g., processor and memory) on the computing device, causing the computing device to operate very slowly with high response times. The events also impair the user experience with the application. The detection of these events can be used to mitigate the negative impacts stemming from such events.

To address these other technical challenges, an application monitoring service can obtain messages from multiple sources where users may provide feedback on the use of the application and classify these messages using machine learning techniques to detect the occurrence of events. These messages may include free text aggregated from a wide variety of channels, such as email, messages, call center transcripts, chat bot messages, or in-app inputs, among others. This can allow the user to input the free text to provide feedback on the application through more channels. The machine learning technique described herein can process the free text to detect such events in conjunction with the use of the application.

With the aggregation of these messages, the application monitoring service can process the free text using a machine learning architecture and a generative model. The machine learning architecture can include a natural language processing (NLP) model and a classifier model. The NLP model can be used to access information resources particular to the application (e.g., specific user interface elements), such as materials about events (e.g., medical state and computer performance) as well as standard operating procedures (SOPs) for the application. Using the free text, the NLP model can integrate retrieval-augmented generation (RAG) techniques and can query for information resources relevant to the content in the free text.

In addition, the classifier model may be trained on examples of sample text that is labeled with an indication of events. The examples may also be particular to the application, and contain previous user submissions regarding events (e.g., performance issues with the application or aggravation of a symptom of the medical condition of the user) for the same application. Both the NLP and classifier models can be used to process the free text to detect any indications of events for the application. The classifier model may be constantly and iteratively updated via interactive learning, with additional examples of sample texts marked as indicative or adverse events. Using the gathered free text, the classifier model can determine a likelihood of an occurrence of a given event and classify which event has occurred in conjunction with the use of the application.

Using the outputs of the NLP and classifier models, the application monitoring service can generate a data element to be used as an input prompt for a generative machine learning model. The data element can include the information resources retrieved by the NLP model, the likelihood of an occurrence of an event, and data related to the message, such as portions of the free text and a timestamp of receipt. The generative model may be trained to create analysis reports and documentation on the event, using a multitude of sample corpora. By providing the input prompt, the application monitoring service can generate a report of the event. The report may include diagnostics or analytics about the event (e.g., potential issues with computing performance or medical state of the user) as well as an action to counter the event. With the generation of the report, the application monitoring service can execute the action in accordance with the specifications of the report. The action may include, for example, disabling particular features of the application causing the event, notifying an administrator of the application, or sending the report to a third-party entity, among others.

In this manner, the application monitoring service can provide for the processing of the free text to detect such events in conjunction with the use of the application. As such, the application monitoring service can carry out actions to mitigate or counter the detected event that otherwise would be left undetected with other approaches. The detection of the event and the performance of the action can improve the performance of the application, the computing device running the application, and the user experience. In the context of digital therapeutics, these can also enhance the adherence rates, leading to better health outcomes and more successful digital therapeutic interventions.

In addition, as an event is detected, information about the event including the initial free text can be fed by the application monitoring service to a generative model to generate a document on the event. Leveraging outputs from both the NLP and classifier models can decrease the likelihood of hallucinations on the part of the generative model when creating the output regarding the events. Hallucinations refer to instances where the generative model creates outputs that are factually incorrect, logically inconsistent, or entirely fabricated. Such errors seriously undermine the credibility and usefulness of the documentation from the generative model used to assess the events. The model architecture containing the NLP and classifier models thus also can improve the quality of the documentation output by the generative model in evaluating the free text messages and selecting action to address any indicated events.

Referring now to FIG. 1, depicted is a block diagram of a system 100 for executing actions for events associated with use of applications detected from free text data. In an overview, the system 100 may include at least one application monitoring service 105, at least one user device 110, at least one administrative device 115, at least one support device 120, at least one remote device 125, among others, communicatively coupled with one another via at least one network 130. The user device 110 may include at least one application 135. The application monitoring service 105 may include at least one model trainer 140, at least one message aggregator 145, at least one event evaluator 150, at least one report generator 155, at least one policy enforcer 160, at least one machine learning (ML) architecture 165, and at least one generative model 170. The ML architecture 165 may include at least one natural language processing (NLP) model 175 and at least one classification model 180, among others. The application monitoring service 105 may include or have access to at least one database 185. The functionalities of the application 135 on the user device 110 may be performed in part on the application monitoring service 105, and vice-versa.

In further detail, the application monitoring service 105 may be any computing device comprising one or more processors coupled with memory and software and capable of performing the various processes and tasks described herein. The application monitoring service 105 may be associated with an entity administering or managing the instances of the application 135 running on one or more user devices 110. The application monitoring service 105 may be in communication with the user device 110, the administrative device 115, the support device 120, and the remote device 125, among others. The application monitoring service 105 may be situated, located, or otherwise associated with at least one computer system. The computer system may correspond to a data center, a branch office, or a site at which one or more computers corresponding to the application monitoring service 105 are situated.

The application monitoring service 105 may include one or more subsystems, modules, or components, among others to execute the various processes and tasks described herein. On the application monitoring service 105, the model trainer 140 may initialize, train, establish, and update the ML architecture 165 and the generative model 170 using training data. The message aggregator 145 may retrieve, identify, or otherwise obtain messages containing free text associated with the application 135 from various sources. The event evaluator 150 may use the ML architecture 165 to process the free text to detect occurrence of events associated with the use of the application 135. The report generator 155 may use the generative model 170 using the outputs from the ML architecture 165 to create electronic documents on the detected events. The policy enforcer 160 may carry out actions in accordance with data of the electronic documents.

The ML architecture 165 may include one or more machine learning (ML) model to process input in the form of free text to generate various outputs. The NLP model 175 may include or execute any number of NLP algorithms to process the free text. In some embodiments, the NLP model 175 may be used to implement or execute retrieval-augmented generation (RAG) for the generative model 170. In general, the NLP model 175 may be used to retrieve one or more of a set of information resources using the free text from the database 185. The NLP model 175 may have at least one input and at least one output. The input may include the free text or data derived from the free text (e.g., tokens or embeddings generated via tokenization). The output may include at least one information resource identified using the input free text. The information resource may include text determined to be relevant to the input free text. The NLP model 175 may use any number of algorithms to identify the relevant information resources, such as term frequency-inverse document frequency (TF-IDF), vector space model (VSM), or latent semantic analysis (LSA), best matching (BM) ranking function, among others.

The classifier model 180 may be used to process free text to determine a value indicating a likelihood of at least one event in conjunction with the use of the application and to classify a type of the event. The architecture for the classifier model 180 may include, for example, a deep learning neural network (e.g., convolutional neural network architecture, a residual network, or a transformer-based architecture), a regression model (e.g., linear or logistic regression model), a random forest, a support vector machine (SVM), a clustering algorithm (e.g., k-nearest neighbors), or a Naïve Bayesian model, among others. The classifier model 180 may be trained using supervised, unsupervised, or semi-supervised learning, among others. In general, the classifier model 180 may have at least one input and at least one output. The input and output may be related via a set of weights. The input may include the free text or data derived from the free text (e.g., tokens or embeddings generated via tokenization). The output may include the value indicating the likelihood of an event in conjunction with the use of the application or a classification of the event.

The generative model 170 may receive inputs to output content in one or more modalities (e.g., in the form of text strings, audio content, images, video, or multimedia content). The input may include the outputs from the ML architecture 165, such as the value of the likelihood of an occurrence of an event and the identified information resources, and at least a portion of the free text. The generative model 170 may be a machine learning model in accordance with a transformer model (e.g., generative pre-trained model or bidirectional encoder representations from transformers). The generative model 170 can be a large language model (LLM), a text-to-image model, a text-to-audio model, or a text-to-video model, among others. In some embodiments, the generative model 170 can be a part of the application monitoring service 105 (e.g., as depicted). In some embodiments, the generative model 170 can be part of a server separate from and in communication with the application monitoring service 105 via the network 130.

The generative model 170 can include a set of weights arranged across a set of layers in accordance with the transformer architecture. Under the architecture, the generative model 170 can include at least one tokenization layer (sometimes referred to herein as a tokenizer), at least one input embedding layer, at least one position encoder, at least one encoder stack, at least one decoder stack, and at least one output layer, among others, interconnected with one another (e.g., via forward, backward, or skip connections). In some embodiments, the transformer layer can lack the encoder stack (e.g., for a decoder-only architecture) or the decoder stack (e.g., for an encoder-only model architecture). The tokenization layer can convert raw input in the form of a set of strings into a corresponding set of word vectors (also referred to herein as tokens, embeddings, or vectors) in an n-dimensional feature space. The input embedding layer can generate a set of embeddings using the set of word vectors. Each embedding can be a lower dimensional representation of a corresponding word vector and can capture the semantic and syntactic information of the string associated with the word vector. The position encoder can generate positional encodings for each input embedding as a function of a position of the corresponding word vector or by extension the string within the input set of strings.

Continuing on, in the generative model 170, an encoder stack can include a set of encoders. Each encoder can include at least one attention layer and at least one feed-forward layer, among others. The attention layer (e.g., a multi-head self-attention layer) can calculate an attention score for each input embedding to indicate a degree of attention the embedding is to place focus on and generate a weighted sum of the set of input embeddings. The feed-forward layer can apply a linear transformation with a non-linear activation (e.g., a rectified linear unit (ReLU)) to the output of the attention layer. The output can be fed into another encoder in the encoder stack in the transformer layer. When the encoder is the terminal encoder in the encoder stack, the output can be fed to the decoder stack.

The decoder stack can include at least one attention layer, at least one encoder-decoder attention layer, and at least one feed-forward layer, among others. In the decoder stack, the attention layer (e.g., a multi-head self-attention layer) can calculate an attention score for each output embedding (e.g., embeddings generated from a target or expected output). The encoder-decoder attention layer can combine inputs from the attention layer in the decoder stack and the output from one of the encoders in the encoder stack and can calculate an attention score from the combined input. The feed-forward layer can apply a linear transformation with a non-linear activation (e.g., a rectified linear unit (ReLU)) to the output of the encoder-decoder attention layer. The output of the decoder can be fed to another decoder in the decoder stack. When the decoder is the terminal decoder in the decoder stack, the output can be fed to the output layer.

The output layer of the generative model 170 can include at least one linear layer and at least one activation layer, among others. The linear layer can be a fully connected layer to perform a linear transformation on the output from the decoder stack to calculate token scores. The activation layer can apply an activation function (e.g., a softmax, sigmoid, or rectified linear unit) to the output of the linear function to convert the token scores into probabilities (or distributions). The probability may represent a likelihood of occurrence for an output token, given an input token. The output layer can use the probabilities to select an output token (e.g., at least a portion of output text, image, audio, video, or multimedia content with the highest probability). Repeating this over the set of input tokens, the resultant set of output tokens can be used to form the output of the overall generative model 170. While described primarily herein in terms of transformer models, the application monitoring service 105 can use other machine learning models to generate and output content.

The user device 110 (sometimes herein referred to as an end user computing device) may be any computing device comprising one or more processors coupled with memory and software and capable of performing the various processes and tasks described herein. The user device 110 may be in communication with the application monitoring service 105, the administrative device 115, the support device 120, the remote device 125, and the database 185 via the network 130. The user device 110 may be operated by or otherwise associated with an end-user using the application 135 on the user device 110. The user device 110 may be a smartphone, other mobile phone, tablet computer, wearable computing device (e.g., smart watch or smart glasses), or laptop computer. The user device 110 may be used to access the application 135. In some embodiments, the application 135 may be downloaded and installed on the user device 110 (e.g., via a digital distribution platform). In some embodiments, the application 135 may be a web application with resources accessible via the network 130.

The application 135 executing on the user device 110 may be a digital therapeutics application and may provide a session (sometimes referred to herein as a therapy session) to address at least one condition (or indication) of the user. The condition of the user may include, for example, a chronic pain (e.g., associated with or include arthritis, migraine, fibromyalgia, back pain, Lyme disease, endometriosis, repetitive stress injuries, irritable bowel syndrome, inflammatory bowel disease, and cancer pain), a skin pathology (e.g., atopic dermatitis, psoriasis, dermatillomania, and eczema), a cognitive impairment (e.g., mild cognitive impairment (MCI), Alzheimer's, multiple sclerosis, and schizophrenia), a mental health condition (e.g., an affective disorder, bipolar disorder, obsessive-compulsive disorder, borderline personality disorder, and attention deficit/hyperactivity disorder), a substance use disorder (e.g., opioid use disorder, alcohol use disorder, tobacco use disorder, or hallucinogen disorder), and other ailments (e.g., narcolepsy and oncology), among others.

The end user may be taking or being administered with an effective amount of the medication to address the condition, in at least partial concurrence with the use of the application 135 (e.g., for any number of sessions). For instance, if the medication is for pain, the end user may be taking acetaminophen, a nonsteroidal anti-inflammatory composition, an antidepressant, an anticonvulsant, or other composition, among others. For skin pathologies, the end user may be taking a steroid, antihistamine, or topic antiseptic, among others. For cognitive impairments, the end user may be taking cholinesterase inhibitors or memantine, among others. For a mental condition, the end user may be taking antidepressants, mood stabilizers, antipsychotics, anxiolytics, or stimulants, among others. For substance abuse disorders, the end user may be taking a naltrexone, disulfiram, acamprosate, or nicotine replacement therapy, among others. The application 135 may increase efficacy of the medication that the user is taking to address the condition. While the application 135 is described primarily herein as a digital therapeutic application, the application 135 may be any type of application, such as a word processor, a spreadsheet editor, a web browser, a video game, a social media application, a multimedia player, messaging application, or a mobile application, among others.

The administrative device 115 (sometimes herein referred to as an administrator computing device) may be any computing device comprising one or more processors coupled with memory and software and capable of performing the various processes and tasks described herein. The administrative device 115 may be in communication with the application monitoring service 105, the user device 110, the support device 120, the remote device 125, and the database 185 via the network 130. The administrative device 115 may be associated with an entity overseeing the operations, updating of, or the development of the application 135. The administrative device 115 may be a smartphone, other mobile phone, tablet computer, wearable computing device (e.g., smart watch or smart glasses), or laptop computer. In some embodiments, the administrative device 115 may be separate from the application monitoring service 105 (e.g., as depicted). In some embodiments, the administrative device 115 may be part of the application monitoring service 105.

The support device 120 (sometimes herein referred to as a call center computing device) may be any computing device comprising one or more processors coupled with memory and software and capable of performing the various processes and tasks described herein. The support device 120 may be in communication with the application monitoring service 105, the user device 110, the administrative device 115, the remote device 125, and the database 185 via the network 130. The support device 120 may be with an entity responsible for responding to end user inquiries regarding application 135 or in charge of the treatment regimen for the end user. The support device 120 may be a smartphone, other mobile phone, tablet computer, wearable computing device (e.g., smart watch or smart glasses), or laptop computer.

The remote device 125 may be any computing device comprising one or more processors coupled with memory and software and capable of performing the various processes and tasks described herein. The support device 120 may be in communication with the application monitoring service 105, the user device 110, the administrative device 115, the remote device 125, and the database 185 via the network 130. The remote device 125 may be with entities to which events associated with the use of the application 135 are to be reported. The entities may include, for example, a regulatory agency (e.g., United States Food & Drug Administration (FDA), European Medicines Agency (EMA), United Kingdom's Medicines and Healthcare products Regulatory Agency (MHRA), Japan's Pharmaceuticals and Medical Devices Agency (PMDA), or China's National Medical Products Administration (NMPA)), a clinical institution (e.g., hospital or individual clinicians), device manufacturer, or a pharmaceutical entity, among others. The remote device 125 may be a smartphone, other mobile phone, tablet computer, wearable computing device (e.g., smart watch or smart glasses), or laptop computer. In some embodiments, the remote device 125 may be situated, located, or otherwise associated with at least one computer system. The computer system may correspond to a data center, a branch office, or a site at which one or more computers corresponding to remote device 125 are situated.

The database 185 may store and maintain various resources and data associated with the application monitoring service 105 and the application 135. The database 185 may include a database management system (DBMS) to arrange and organize the data maintained thereon among others. The database 185 may be in communication with the application monitoring service 105, the user device 110, the administrative device 115, the support device 120, and the remote device 125, via the network 130. While running various operations, the application monitoring service 105 and the application 135 may access the database 185 to retrieve identified data therefrom. The application monitoring service 105 and the application 135 may also write data onto the database 185 from running such operations.

Figure 2:
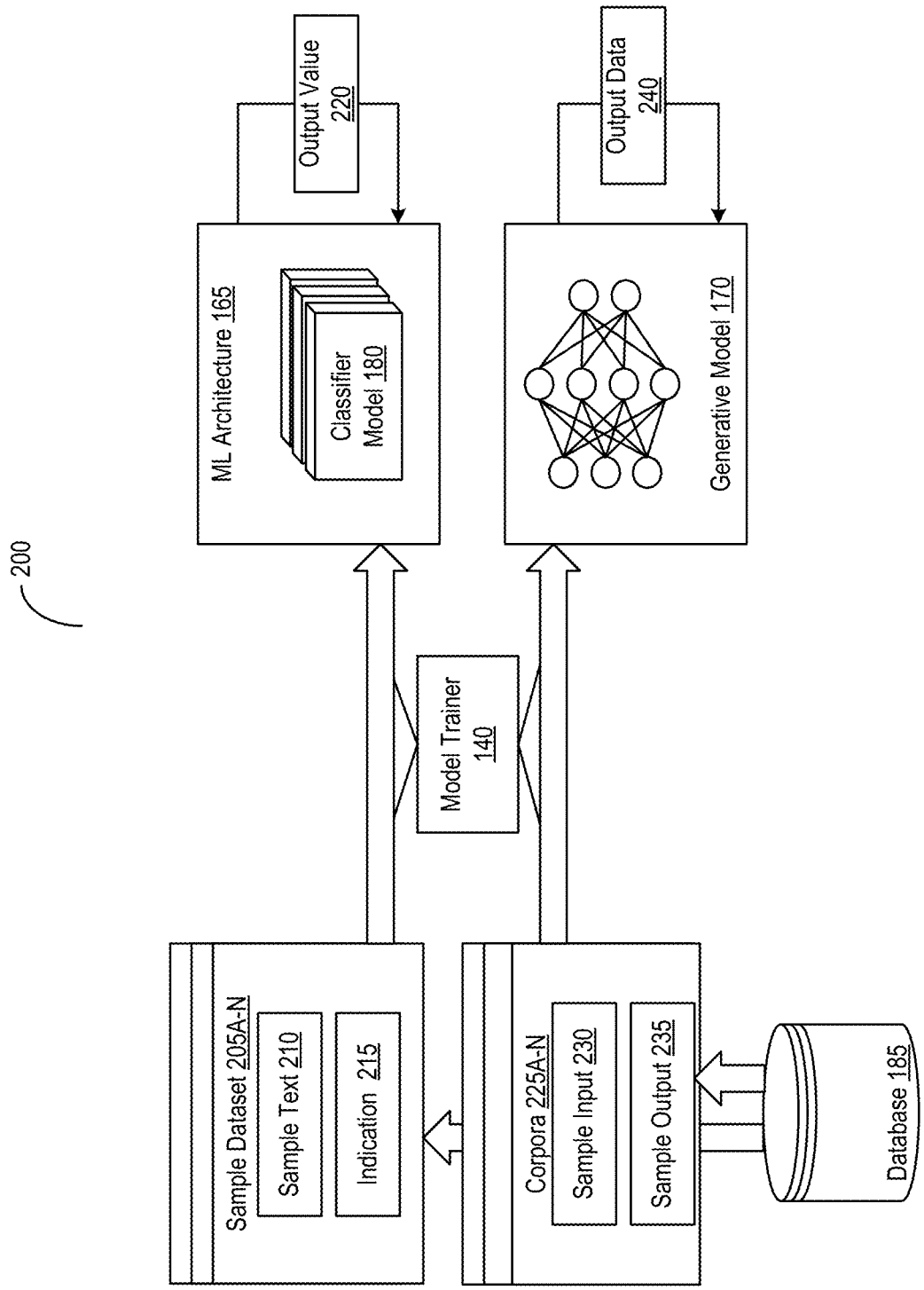
FIG. 2 depicts a block diagram for a process to train machine learning (ML) architectures and generative models in the system for executing actions for events, in accordance with an illustrative embodiment.

FIG. 2 depicts a block diagram for a process 200 to train machine learning (ML) architectures and generative models in the system 100 for executing actions for events. The process 200 may include or correspond to operations in the system 100 to initialize, train, and establish the ML architecture 165 and the generative model 170. Under the process 200, the model trainer 140 on the application monitoring service 105 may initialize, train, or establish the ML architecture 165 (e.g., the classifier model 180 as depicted). The ML architecture 165 may be established particularly for processing text associated with the specified application 135. To train the classifier model 180, the model trainer 140 may retrieve, obtain, or otherwise identify a set of sample datasets 205A-N(hereinafter generally referred to as sample datasets 205) from the database 185. The sample datasets 205 may be used to train the classifier model 180.

Each sample dataset 205 may identify or include at least one sample text 210 labeled with at least one indication 215, among others. The sample text 210 may include free text associated with the use of a sample application. The sample application may correspond to the application 135 or another application within a similar field (e.g., digital therapeutics applications from the same developer). The sample text 210 may be gathered from previous submissions of user complaints or issues about the sample application. The sample text 210 may be, for example, from an email, a text message (e.g., a short message service (SMS) or multimedia message service (MMS) message), a voice transcript (e.g., generated via automated speech recognition (ARS) transcriptions of call center calls), a chatbot message (e.g., through an in-app help interface with a chatbot), an electronic post (e.g., a social media posting, an app review posts, or a comment), or a communication platform message (e.g., a message through a messaging application), among others.

The indication 215 may identify a presence or an absence of a respective event associated with the use of the application. The event may include, for example, an adverse event (e.g., an unexpected or undesired experience associated with use of the application affecting a medical state of the user), a serious adverse event (e.g., severe harm or life-threatening event), a software bug (e.g., exception thrown, slow response time, or laggy performance), a user complaint (e.g., user difficulty with technology, user preference with undesirable interface design), or a usability issue (e.g., unresponsive feature, missing feature, or improvement suggestions), among others. In some embodiments, the event may be defined relative to another setting or context. For example, the event may include, for example, an adverse event (e.g., an unexpected or undesired experience associated with use of the application affecting a medical state of the user during a clinical trial), a serious adverse event (e.g., severe harm or life-threatening event during a clinical trial), an incident (e.g., an unexpected or undesired experience associated with use of the application affecting a medical state of the user outside of a clinical trial), or a serious incident (e.g., severe harm or life-threatening event outside of a clinical trial), among others. The indication 215 may define, specify, or identify the type of event present (or absent) in the associated sample text 210. For example, the indication 215 may specify that the sample text 210 is indicative of a software bug, but not an adverse event affecting the medical state of the user.

With the identification, the model trainer 140 may provide, feed, or otherwise apply the sample text 210 to the classifier model 180 of the ML architecture 165. In some embodiments, the model trainer 140 may generate input data using the sample text 210 for provision to the classification model 180. The input data may include tokens (also referred to as word vectors or embeddings) in an n-dimensional space for processing by the ML architecture 165. The model trainer 140 may process the sample text 210 (or the derivative input data) using the set of weights of the classifier model 180. From processing, the model trainer 140 may generate at least one output value 220 for at least one corresponding event. The output value 220 may identify or indicate a likelihood of an occurrence of the corresponding event associated with the use of the sample application using the sample text 210. In some embodiments, the model trainer 140 may generate a set of output values 220 for a corresponding set of event types. In some embodiments, the model trainer 140 may determine a classification of the event in the sample text 210.

The model trainer 140 may calculate, generate, or otherwise at least one loss metric based on a comparison between the output value 220 and the indication 215 for the sample text 210 of the sample dataset 205. In some embodiments, the model trainer 140 may compare the classification versus the indication 215 to determine the loss metric. The loss metric may indicate a degree of deviation of the output value 220 relative to the indication 215. The loss metric may be generated in accordance with any number of loss functions, such as any number of loss functions, such as a norm loss (e.g., L1 or L2), mean absolute error (MAE), mean squared error (MSE), a quadratic loss, a cross-entropy loss, and a Huber loss, among others. In general, the more incorrect the output value 220 is relative to the indication 215, the higher the loss metric may be. Conversely, the more correct the output value 220 is relative to the indication 215, the lower the loss metric may be.

Using the loss metric, the model trainer 140 may modify, change, or otherwise update at least one parameters of the classifier model 180. The updating of parameters of the classifier model 180 may be in accordance with objective function. The objective function may define one or more rates at which the parameters of the classifier model 180 are to be updated. The objective function may be in accordance with stochastic gradient descent, and may include, for example, an adaptive moment estimation (Adam), implicit update (ISGD), and adaptive gradient algorithm (AdaGrad), among others. The model trainer 140 may iterate through the set of sample datasets 205 to iteratively update the ML architecture 165. The updating of the parameters of the classifier model 180 may be repeated until convergence. Upon completion of training, the model trainer 140 may store and maintain the set of parameters of the classifier model 180.

In addition, the model trainer 140 may initialize, train, or establish the generative model 170. In some embodiments, the model trainer 140 may fine-tune, modify, or otherwise update the generative model 170 that was previously trained. The generative model 170 may be established particularly for processing text associated with the specified application 135. To train, the model trainer 140 may retrieve, obtain, or otherwise identify a set of corpora 225A-N (hereinafter generally referred to as corpora 225) from the database 185. In some embodiments, at least one of the corpora 225 can be generalized dataset. For instance, the generalized text for the corpus 225 can be obtained from a large and unstructured set of text without any focus to a particular knowledge domain. In some embodiments, at least one corpora 225 may be a knowledge domain specific dataset. Each corpus 225 may identify or include at least one sample input 230 and at least one sample output 235, among others.

The sample input 230 may include or identify at least one sample data element to be used as part of an input to the generative model 170. The sample data element may include or identify at least one sample value and at least one sample information resource, among others. The sample value may indicate a degree of likelihood of the occurrence of at least one corresponding event, as determined from sample free text. The sample information resource may include information resources identified as relevant to the free text. The sample information resource may be, for example, a text passage identifying user interface elements in the sample application (e.g., the application 135), standard operating procedures (SOPs) for using the application, and articles on medical conditions for which the digital therapeutic is to address, among others. In some embodiments, the sample data element of the sample input 230 may include at least one sample event type and sample message data. The sample event type may identify a type of event that the sample free text is classified. The message data may include or identify at least a portion of the sample free text itself and various types of information about the sample free text. The information may include a timestamp of receipt, a location of the user, a device type, or a condition of the user, among others.

The sample output 235 may include or identify expected output data 240 from the generative model 170 when the associated sample input 230 is applied. The sample output 235 may include natural language description characterizing the event apparent in the sample input 230 and recommended countermeasures to address the event. The sample output 235 may include or identify, for example, a diagnostics of at least one corresponding event associated with the use of the sample application, an analytics of the event, a sample action to counter the event, and one or more recommendations for the user of the application, among others. The diagnostics may define or identify occurrence, cause, and impact of events on the sample application, the user, and the user device, among others. The analytics may identify or include a report documenting the event in detail, such as nature and circumstances of the event, the classification type of event, source of the free text associated with the event, the state of the sample application, the user's condition, the state of the user device, and statistical descriptors of the event, among others.

Continuing on, in the sample output 235, the sample actions may identify or include corrective countermeasures to address the at least one event. The sample actions may include, for example, terminating use of the sample application on the user device of the user, modifying or restricting an operation (e.g., feature or functions) in the application associated with the event, sending of a notification to the user device or the support device, sending a report to the administrative device, sending a notification to a remote device, or storing of the report associated with the event, among others. The sample recommendations may identify or include steps to be taken by the user to address the event. For example, the sample recommendations may include a guide on how to use a particular feature (e.g., logging in or opening an icon) of the application or how to complete a set of lessons for the user when the event is a usability issue about the feature or lesson.

With the identification, the model trainer 140 can establish or train the generative model 170 using the set of corpora 225. In some embodiments, the model trainer 140 can initialize the generative model 170. For example, the model trainer 140 can instantiate the generative model 170 by assigning random values to the weights within the layers. In some embodiments, the model trainer 140 can fine-tune a pre-trained generative model 170 (e.g., ChatGPT, LLAMA, and Stable Diffusion models) using the set of corpora 225. To train or fine-tune, the model trainer 140 can define, select, or otherwise identify at least a portion of each corpus 225 as a source set (e.g., at least a portion of the sample input 230) and at least a portion of each corpus 225 as a destination set (e.g., at least a portion of the sample output 235). In some embodiments, the model trainer 140 can select or identify the source set and the destination set using the mapping in the corpus 225. The source set may be used as input into the generative model 170 to produce an output to be compared against the destination set. The portions of each corpus 225 can at least partially overlap and may correspond to a subset of text strings across the sample input 230 and sample output 235.

For each corpus 225, the model trainer 140 can feed or apply the strings of the source set from the corpus 225 into the generative model 170. In applying, the model trainer 140 can process the input strings in accordance with the set of layers in the generative model 170. As discussed above, the generative model 170 may include the tokenization layer, the input embedding layer, the position encoder, the encoder stack, the decoder stack, and the output layer, among others. The model trainer 140 may process the input strings (words or phrases in the form of alphanumeric characters) of the source set using the tokenizer layer of the generative model 170 to generate a set of word vectors for the input set. Each word vector may be a vector representation of at least one corresponding string in an n-dimensional feature space (e.g., using a word embedding table). The model trainer 140 may apply the set of word vectors to the input embedding layer to generate a corresponding set of embeddings. The model trainer 140 may identify a position of each string within the set of strings of the source set. With the identification, the model trainer 140 can apply the position encoder to the position of each string to generate a positional encoding for each embedding corresponding to the string and by extension the embedding.

The model trainer 140 may apply the set of embeddings along with the corresponding set of positional encodings generated from the input set of the corpus 225 to the encoder stack of the generative model 170. In applying, the model trainer 140 may process the set of embeddings along with the corresponding set of positional encodings in accordance with the layers (e.g., the attention layer and the feed-forward layer) in each encoder in the encoder block. From the processing, the model trainer 140 may generate another set of embeddings to feed forward to the encoders in the encoder stack. The model trainer 140 may then feed the output of the encoder stack to the decoder stack.

In conjunction, the model trainer 140 may process the destination set using a separate tokenizer layer of the generative model 170 to generate a set of word vectors for the destination set. The destination set may be of the same modality as the source set of the corpus 225 or may be of a different modality as the source set of the corpus 225. Each word or code vector may be a vector representation of at least one corresponding string in an n-dimensional feature space (e.g., using a word embedding table). The model trainer 140 may apply the set of word or code vectors to the input embedding layer to generate a corresponding set of embeddings. The model trainer 140 may identify a position of each string within the set of strings of the target set. With the identification, the model trainer 140 can apply the position encoder to the position of each string to generate a positional encoding for each embedding corresponding to the string and by extension the embedding.

The model trainer 140 may apply the set of embeddings along with the corresponding set of positional encodings generated from the destination set of the corpus 225 to the decoder stack of the generative model 170. The model trainer 140 may also combine the output of the encoder stack in processing through the decoder stack. In applying, the model trainer 140 may process the set of embeddings along with the corresponding set of positional encodings in accordance with the layers (e.g., the attention layer, the encoder-decoder attention layer, the feed-forward layer) in each decoder in the decoder block. The model trainer 140 may combine the output from the encoder with the input of the encoder-decoder attention layer in the decoder block. From the processing, the model trainer 140 may generate an output set of embeddings to be fed forward to the output layer.

Continuing on, the model trainer 140 may feed the output from the decoder block into the output layer of the generative transformer layer. In feeding, the model trainer 140 may process the embeddings from the decoder block in accordance with the linear layer and the activation layer of the output layer. With the processing, the model trainer 140 may calculate probability for each embedding. The probability may represent a likelihood of occurrence for an output, given an input token. Based on the probabilities, the model trainer 140 may select an output token (e.g., at least a portion of the sample output 235) with the highest probability) to form, produce, or otherwise generate output data 240. The output data 240 can include the sample diagnosis, the actions, analytics, or recommendations, or any combination thereof. The output data 240 can be in the same modality as the target set of the corpus 225. While described primarily in terms of transformer model architecture, other architectures can be used for the generative model 170 to output content.

With the generation, the model trainer 140 can compare the output data 240 from the generative model 170 with the destination set of the corpus 225 used to generate the output data 240. The comparison can be between the probabilities (or distribution) of various tokens for the content from the output data 240 versus the probabilities of tokens in the target set of the corpus 225. For instance, the model trainer 140 can determine a difference between a probability distribution of the output data 240 versus the target set of the corpus 225 to compare. The probability distribution may identify a probability for each candidate token in the output data 240 or the token in the target set of the corpus 225. Based on the comparison, the model trainer 140 can calculate, determine, or otherwise generate a loss metric. The loss metric may indicate a degree of deviation of the output data 240 from the expected output as defined by the target set of the corpus 225 used to generate the output data 240. The loss metric may be calculated in accordance with any number of loss functions, such as a norm loss (e.g., L1 or L2), mean squared error (MSE), quadratic loss, cross-entropy loss, or Huber loss, among others.

In some embodiments, the model trainer 140 may determine the loss metric for the output data 240 based on the data retrieved from the database 185. In determining, the model trainer 140 may compare the content of the output data 240 with the destination set (e.g., at least a portion of the sample output 235) to calculate a degree of similarity. The degree of similarity may measure, correspond to, or indicate, for example, a level of code similarity (e.g., using a knowledge map when comparing between sample output 235 and the output data 240). In general, the higher the loss metric, the more the generated output may have deviated from the expected output corresponding to the destination set derived from the corpus 225. Conversely, the lower the loss metric, the less the generated output may have deviated from the expected output derived from the destination set. The loss metric may be calculated to train the generative model 170 to generate output content with a higher probability of accurate generation of the output.

Figure 3:
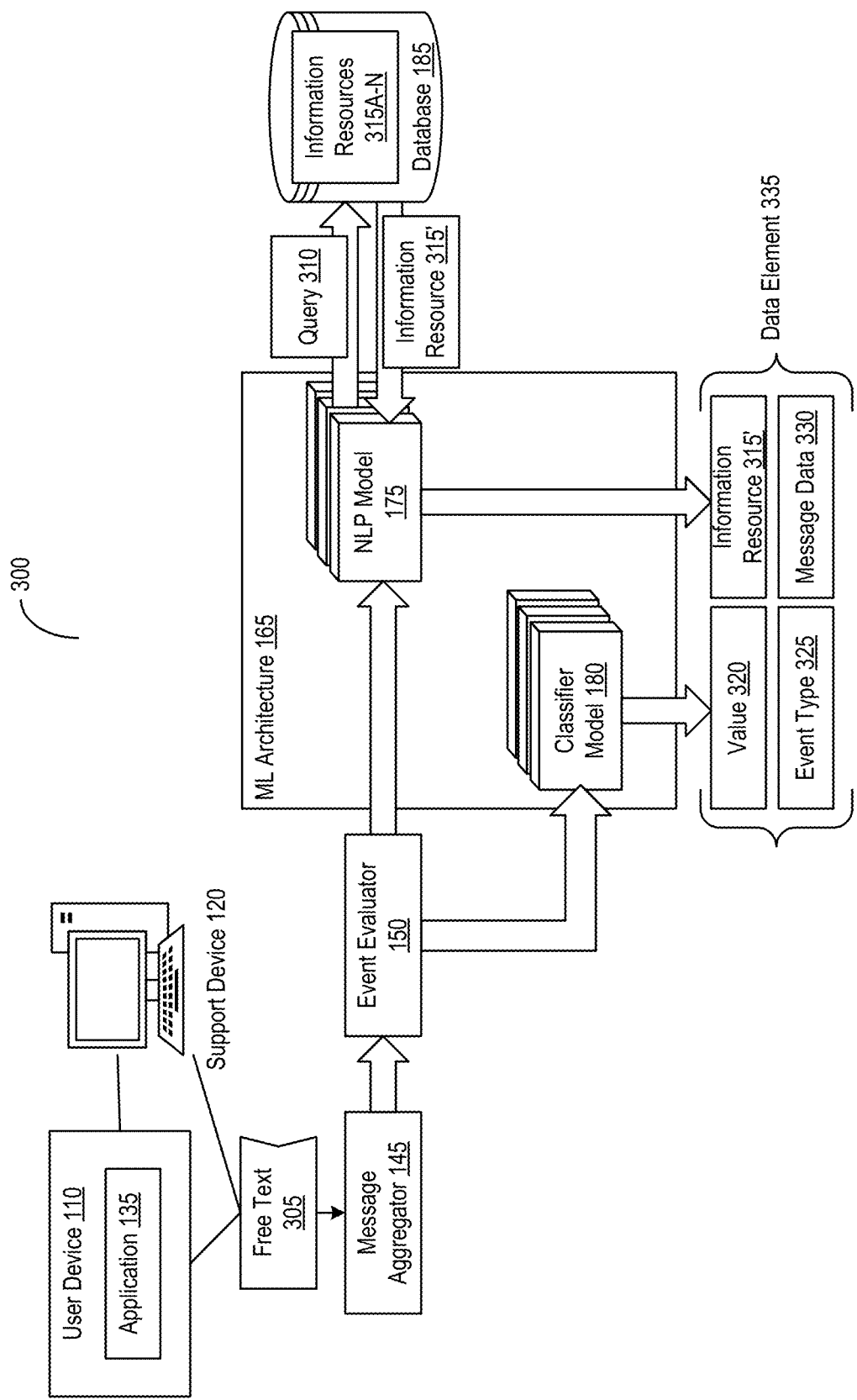
FIG. 3 depicts a block diagram for a process to detect events from free text in the system for executing actions for events, in accordance with an illustrative embodiment.

Using the loss metric, the model trainer 140 can update one or more weights in the set of layers of the generative model 170. The updating of the weights may be in accordance with a back propagation and optimization function (sometimes referred to herein as an objective function) with one or more parameters (e.g., learning rate, momentum, weight decay, and number of iterations). The optimization function may define one or more parameters at which the weights of the generative model 170 are to be updated. The optimization function may be in accordance with stochastic gradient descent, and may include, for example, an adaptive moment estimation (Adam), implicit update (ISGD), and adaptive gradient algorithm (AdaGrad), among others. The model trainer 140 can iteratively train the generative model 170 until convergence. Upon convergence, the model trainer 140 can store and maintain the set of weights for the set of layers of the generative model 170 for use in inference stage FIG. 3 depicts a block diagram for a process 300 to detect events from free text in the system 100 for executing actions for events. The process 300 may include or correspond to operations in the system 100 to evaluate free text in messages from users in conjunction with the use of applications. Under the process 300, the message aggregator 145 executing on the application monitoring service 105 may retrieve, receive, or otherwise identify at least one free text 305 associated with the application 135. The free text 305 may be identified for evaluation for one or more events associated with the use of the application 135. The free text 305 may contain or include a sequence of alphanumeric characters, independent of a predefined data structure.

The free text 305 may be obtained from a variety of sources, such as email (e.g., received on a support contact), a text message (e.g., a short message service (SMS) or multimedia message service (MMS) message), a voice transcript (e.g., generated via automated speech recognition (ARS) transcriptions of call center calls), a chatbot message (e.g., through an in-app help interface with a chatbot), an electronic post (e.g., a social media posting, an app review post, or a comment), or a communication platform message (e.g., a message through a messaging application). The free text 305 may correspond to alphanumeric characters without a predefined data structure (e.g., field-value pairs). The free text 305 may include the alphanumeric characters in an unstructured format. In some embodiments, the free text 305 may correspond to text from an element within a structured dataset, without the definition of the format. For instance, the free text 305 may correspond to a portion of text within an inline frame within a webpage using a Hypertext Markup Language (HTML).

In some embodiments, the message aggregator 145 may identify or retrieve the free text 305 from defined data sources via the network 130. The data sources may include, for example, a website for reviews of mobile applications (e.g., with electronic posts created by users) or a distribution service for downloading of applications (including the application 135), among others. Each data source may be identified via an address (e.g., a uniform resource locator (URL). The address may be provided by the system administrator of the application 135 (e.g., via the administrative device 115). Using the address, the message aggregator 145 may access the corresponding data source to retrieve or identify the free text 305. For instance, the message aggregator 145 may access a website or distribution service hosting reviews of mobile applications, and may retrieve the electronic posts with reviews by users of the application 135.

In some embodiments, the message aggregator 145 may identify the free text 305 from the application 135 on the user device 110. The message aggregator 145 may establish at least one event listener on the application 135 to monitor for the generation of the free text 305 by the user of the application 135 on the user device 110. For instance, the event listener may receive text inputted by the user in a user interface for feedback about the application 135. Upon receipt, the event listener on the application 135 may provide the input as the free text 305 to the message aggregator 145. The message aggregator 145 may retrieve, fetch, or otherwise obtain the free text 305 via an application programming interface (API) of the event listener of the application 135. The API may permit invocation of various functions of the application 135 from outside the application 135. In some embodiments, the message aggregator 145 may receive the free text 305 from the support device 120 (or another device). For instance, the free text 305 may correspond to a call transcript generated using automated speech recognition (ASR) while the staff member using the support device 120 is on a telephone call with the user of the application 135.

With the identification, the message aggregator 145 may determine whether the free text 305 is associated with the use of the application 135. To determine, the message aggregator 145 may use a natural language processing (NLP) algorithm (e.g., keyword extraction, information extraction, or text mining) to extract or identify one or more keywords from the free text 305 relevant to the usage of the application 135. For example, the message aggregator 145 may use the NLP algorithm to detect keywords for the condition to be addressed by the application 135 or symptoms related to the condition, among others. If at least one keyword is detected, the message aggregator 145 may determine that the free text 305 is associated with the use of the application 135. In addition, the message aggregator 145 may pass the free text 305 to the event evaluator 150 for additional processing. Otherwise, if no keyword is detected, the message aggregator 145 may discard the free text 305 from further processing.

The event evaluator 150 executing on the application monitoring service 105 may provide, feed, or otherwise apply the free text 305 to the ML architecture 165, including the NLP model 175 and the classification model 180. In some embodiments, the event evaluator 150 may generate input data using the free text 305 for provision to the ML architecture 165. The input data may include tokens (also referred to word vectors or vectors) in an n-dimensional space for processing by the ML architecture 165. In applying the free text 305 to the NLP model 175, the event evaluator 150 may create, determine, or generate at least one query 310 to search a set of information resources 315A-N(hereinafter generally referred to as information resources 315) on the database 185 (or another data source). The query 310 may be generated using at least a portion of the free text 305. In some embodiments, the event evaluator 150 may use a query expansion (QE) algorithm, such as vector space expansion, latent semantic analysis, knowledge graphs, statistical expansion, or synonym expansion, among others.

Using the query 310 and the NLP model 175, the event evaluator 150 may find, select, or otherwise identify at least one information resource 315' from the set of information resources 315. The set of information resources 315 may be associated with the application 135. Each information resource 315 may include content (e.g., in the form of text, tokens, vectors, or embeddings) that are relevant to various aspects of the use of the application 135. For example, the information resources 315 may include passages on individual user interfaces available through the application 135, standard operation procedures (SOPs) for operating the application 135 through various devices, the conditions to be addressed via the application 135, or prior submissions by other users associated with the use of the application 135, among others. The NLP model 175 may use various functions, such as term frequency-inverse document frequency (TF-IDF), vector space model (VSM), or latent semantic analysis (LSA), or best matching (BM) ranking function, among others, to select at least one information resource 315' that is relevant the query 310. The information resource 315' may be used to implement retrieval-augmented generation (RAG) on the generative model 170.

In conjunction, based on applying the free text 305 to the classification model 180 of the ML architecture 165, the event evaluator 150 may calculate, generate, or otherwise determine at least one value 320. In applying, the event evaluator 150 may process the free text 305 in accordance with the set of weights of the classification model 180 to generate the value 320. The value 320 may identify, define, or otherwise indicate a likelihood of occurrence of at least one event associated with the use of the application 135. In some embodiments, the value 320 may identify, define, or otherwise indicate a risk of the event associated with the use of the application 135. The value 320 may be a numerical value with any range between 0 to 1, 0 to 100, −1 to 1, or −100 to 100, among others. In general, the higher the value 320, the more likely the corresponding event may have occurred during the use of the application 135. Conversely, the lower the value 320, the less likely the corresponding event may have occurred during the use of the application 135. In some embodiments, the event evaluator 150 may determine a set of values 320 for a corresponding set of event types, from applying the free text 305 to the classification model 180.

In some embodiments, the event evaluator 150 may generate, determine, or classify an event type 325 of the event based on applying the free text 305 to the classification model 180. The event type 325 may identify the event as at least one of an adverse event (e.g., an unexpected or undesired event associated with use of the application affecting a medical state of the user), a serious adverse event (e.g., severe harm or life-threatening event), a software bug (e.g., exception thrown, slow response time, or laggy performance), a user complaint (e.g., user difficulty with technology, user preference with undesirable interface design), or a usability issue (e.g., unresponsive feature, missing feature, or improvement suggestions), among others. In some embodiments, the event may be defined relative to another setting or context. For example, the event may include, for example, an adverse event (e.g., an unexpected or undesired experience associated with use of the application affecting a medical state of the user during a clinical trial), a serious adverse event (e.g., severe harm or life-threatening event during a clinical trial), an incident (e.g., an unexpected or undesired experience associated with use of the application affecting a medical state of the user outside of a clinical trial), or a serious incident (e.g., severe harm or life-threatening event outside of a clinical trial), among others. The event evaluator 150 may classify the event type 325 using the set of values 320 generated for the set of event types. The event evaluator 150 may select or identify the event type 325 corresponding to the highest value 320. For example, when the value 320 for the adverse event for a particular symptom is the highest, the event evaluator 150 may classify the event type 325 as the adverse event with the defined symptom associated with the use of the application 135.

Using the outputs from the ML architecture 165, the event evaluator 150 may create, construct, or otherwise generate at least one data element 335. The data element 335 may identify or include one or more of the information resource 315', the value 320, the event type 325, and message data 330, among others. The message data 330 may include, for example, at least a portion of the free text 305 and metadata associated with the free text 305. The metadata may include, for example, a timestamp associated with a message including the free text 305 (e.g., timestamp of generation or receipt), a user identifier, an application instance identifier, a device identifier, a device location, or a condition to be addressed by the application 135, among others. The data element 335 may be a data structure (e.g., a table, matrix, linked list, tree, array, or class) for including one or more of the information resource 315', the value 320, the event type 325, and message data 330, among others. The data element 335 may be used as input to the generative model 170.

Figure 4:
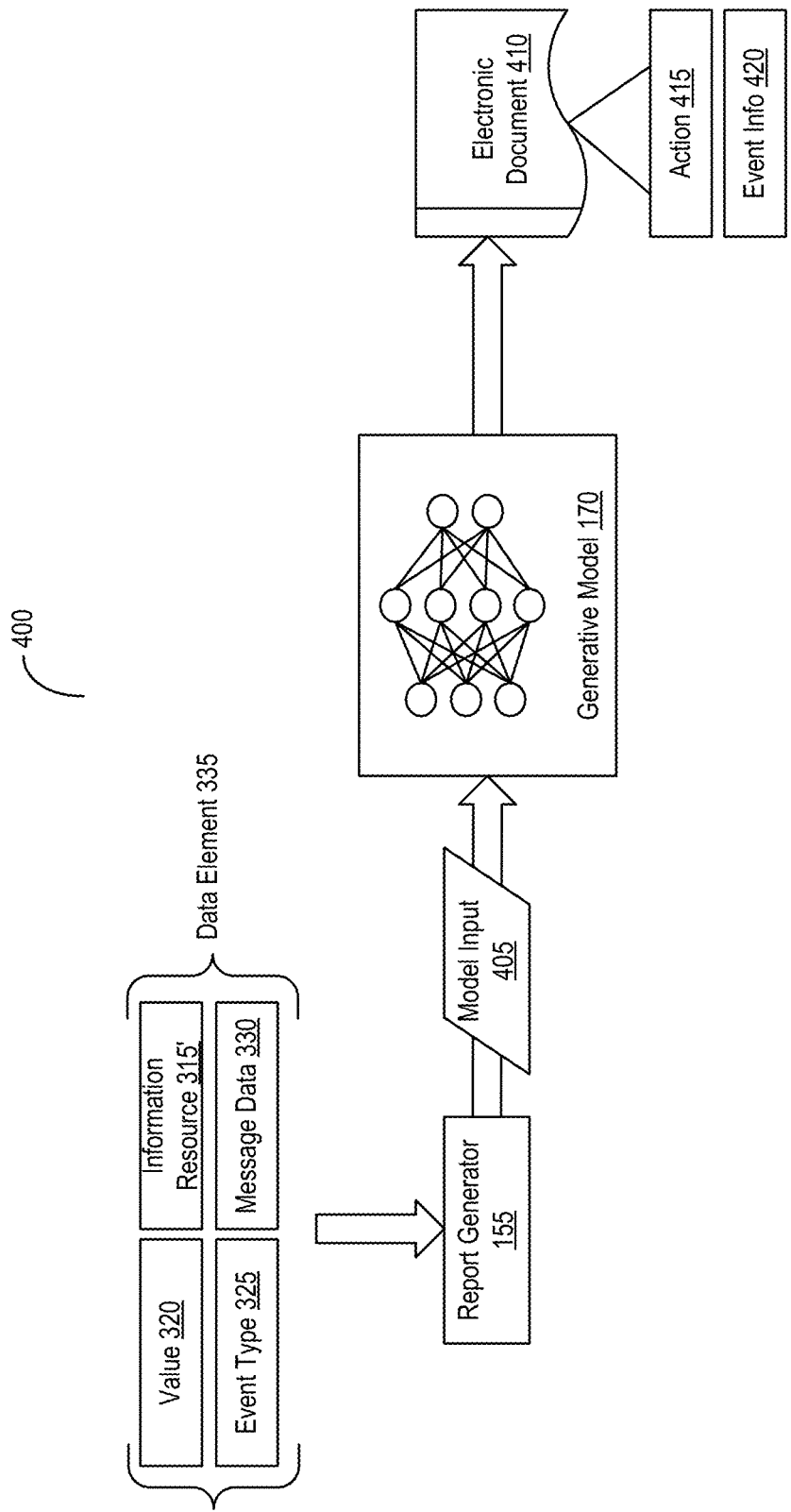
FIG. 4 depicts a block diagram for a process to generate electronic documents on events in the system for executing actions for events, in accordance with an illustrative embodiment.

FIG. 4 depicts a block diagram for a process 400 to generate electronic documents on events in the system 100 for executing actions for events. The process 400 may include or correspond to operations in the system 100 to evaluate free text in messages from users in conjunction with the use of applications. Under the process 400, the report generator 155 executing on the application monitoring service 105 may identify or determine whether the value 320 indicating the likelihood of the corresponding event satisfies a threshold. The threshold may define a value at which the report generator 155 is to provide an input to the generative model 170 to produce reports on the detected event. In some embodiments, the report generator 155 may iterate through the set of values 320 for the corresponding set of event types to compare against the threshold.

If the value 320 does not satisfy (e.g., less than) the threshold, the report generator 155 may identify or determine that no event has occurred. When none of the set of values 320 satisfies the threshold, the report generator 155 may determine that no event has occurred. The report generator 155 may also refrain from further processing of the free text 305 or the data element 335. The report generator 155 may generate an indication of the absence of any event associated with the use of the application 135 in the free text 305. The report generator 155 may transmit, send, or otherwise provide the indication to the administrative device 115 along with the free text 305. On the other hand, if the value 320 satisfies (e.g., greater than or equal to) the threshold, the report generator 155 may identify or determine that the corresponding event has occurred associated with the use of the application 135. If at least one of the set of values 320 satisfy the threshold, the report generator 155 may determine that the corresponding events have occurred. The report generator 155 may also identify the event type 325 corresponding to the value 320 satisfying the threshold. The report generator 155 may continue processing the free text 305 and the data element 335.

The report generator 155 may create, produce, or otherwise generate at least one model input 405 (sometimes herein referred to as a prompt) to be used as input to the generative model 170 based on the at least a portion of the data element 335. The generation of the model input 405 may be in response to determining that the value 320 satisfies the threshold. The model input 405 may be based on one or more of the free text 305, the information resource 315', the value 320, the event type 325, and the message data 330, among others. In some embodiments, the model input 405 may be based on at least a portion of the free text 305 and the value 320. In some embodiments, the report generator 155 may create the model input 405 to include context information in accordance with a template. The template may include a set of predefined strings and a set of placeholders. The set of predefined strings may include, for example, a directive or command to create a particular type of output at the generative model 170, such as the text string "Please create a report on this [event type] using the information . . . " The set of placeholders may be for including information from the data element 335. The context information may be derived from one or more of the free text 305, the information resource 315', the value 320, the event type 325, and the message data 330. The context information may, for example, include additional data about the user, the application 135, and the condition to be addressed, among others.

The report generator 155 may feed, apply, or otherwise provide the model input 405 to the generative model 170. In applying, the report generator 155 can process the model input 405 using the set of layers in the generative model 170. As discussed above, the generative model 170 may include the tokenization layer, the input embedding layer, the position encoder, the encoder stack, the decoder stack, and the output layer, among others. The report generator 155 may process the input strings (code in the form of alphanumeric characters) of the model input 405 using the tokenizer layer of the generative model 170 to generate a set of word vectors (sometimes herein referred to as word tokens or tokens) for the input set. Each word vector may be a vector representation of at least one corresponding input (e.g., portions of the data element 335) in an n-dimensional feature space (e.g., using a word embedding table).

The report generator 155 may apply the set of word vectors to the input embedding layer to generate a corresponding set of embeddings. The report generator 155 may identify a position of each string within the set of strings of the model input 405. With the identification, the report generator 155 can apply the position encoder to the position of each string to generate a positional encoding for each embedding corresponding to the string and by extension the embedding. The report generator 155 may apply the set of embeddings along with the corresponding set of positional encodings generated from the model input 405 to the encoder stack of the generative model 170. In applying, the report generator 155 may process the set of embeddings along with the corresponding set of positional encodings in accordance with the layers (e.g., the attention layer and the feed-forward layer) in each encoder in the encoder block. From the processing, the report generator 155 may generate another set of embeddings to feed forward to the encoders in the encoder stack. The report generator 155 may then feed the output of the encoder stack to the decoder stack.

In conjunction, the report generator 155 may input an initiation input (sometimes referred to herein as a start token) using a separate tokenizer layer of the generative model 170 to generate one or more word vectors. Each word vector may be a vector representation of at least one corresponding string in an n-dimensional feature space (e.g., using a word embedding table). The report generator 155 may apply the set of word vectors to the input embedding layer to generate a corresponding set of embeddings. The report generator 155 may identify a position of each string within the set of strings of the target set. With the identification, the report generator 155 can apply the position encoder to the position of each string to generate a positional encoding for each embedding corresponding to the string and by extension the embedding.

The report generator 155 may apply the set of embeddings along with the corresponding set of positional encodings generated from the decoder stack of the generative model 170. The report generator 155 may also combine the output of the encoder stack in processing through the decoder stack. In applying, the report generator 155 may process the set of embeddings along with the corresponding set of positional encodings in accordance with the layers (e.g., the attention layer, the encoder-decoder attention layer, the feed-forward layer) in each decoder in the decoder block. The report generator 155 may combine the output from the encoder with the input of the encoder-decoder attention layer in the decoder block. From the processing, the report generator 155 may generate an output set of embeddings to be fed forward to the output layer.

Continuing on, the report generator 155 may feed the output from the decoder block into the output layer of the generative transformer layer. In feeding, the report generator 155 may process the embeddings from the decoder block in accordance with the linear layer and the activation layer of the output layer. With the processing, the report generator 155 may calculate a probability for each embedding. The probability may represent a likelihood of occurrence for an output, given an input token. Based on the probabilities, the report generator 155 may select an output token (e.g., at least a portion of diagnostics, analytics, actions, or recommendations with the highest probability) to form, produce, or otherwise generate a portion of the output. The report generator 155 may repeat the above-described processing using the layers of the generative model 170 to form the entirety of the output.

From providing the model input 405 to the generative model 170, the report generator 155 can produce, generate, or otherwise obtain data for at least one electronic document 410 (sometimes herein referred to as a report or documentation). The electronic document 410 may characterize the event associated with the use of the application 135. The electronic document 410 may include or identify one or more of at least one action 415 and event information 420, among others. The electronic document 410 may include a natural language text description of the actions 415 and the event information 420. The action 415 may be selected from one or more of, for example, terminating use of the application 135 on the user device 110, modifying or restricting an operation (e.g., feature or functions) in the application 135 associated with the event, sending of a notification to the user device 110 or the support device 120, sending the electronic document 410 to the administrative device 115, sending the electronic document 410 to the remote device 125, or storing of the electronic document 410 associated with the event on the database 185, among others. In some embodiments, the electronic document 410 may include or identify one or more recommendations for the event. The recommendations may include steps for the user of the application 135 to perform to address the event. For instance, the recommendations of the electronic document 410 may include a set of steps for the user to find a particular user interface element (e.g., button) within the graphical user interface for the application 135.

The event information 420 may include information derived from portions of the data element 335, such as the value 320, the event type 325, and the message data 330, among others. The event information 420 may identify or include diagnostics of the event associated with the use of the application 135. The diagnostics may define or identify occurrence, cause, and impact of events on the application 135, the user, and the user device 110, among others. For example, the diagnostics for the event information 420 of the electronic document 410 may include text stating "The likely cause (with a probability of 0.8) of the application slowing down is due to the type of smartphone used for playing audio stimuli." The event information 420 may identify or include analytics of the event associated with the use of the application 135. The analytics may identify or include a report documenting the event in detail, such as nature and circumstances of the event, the classification type of event, source of the free text associated with the event, the state of the application, the user's condition, the state of the user device 110, and statistical descriptors of the event, among others. For instance, the analytics for the event information 420 of the electronic document 410 may include text stating "The event occurred around Mar. 15, 2025, at 3:30:45 pm (US EST). At this time, the user experienced nausea while using the application."

Figure 5:
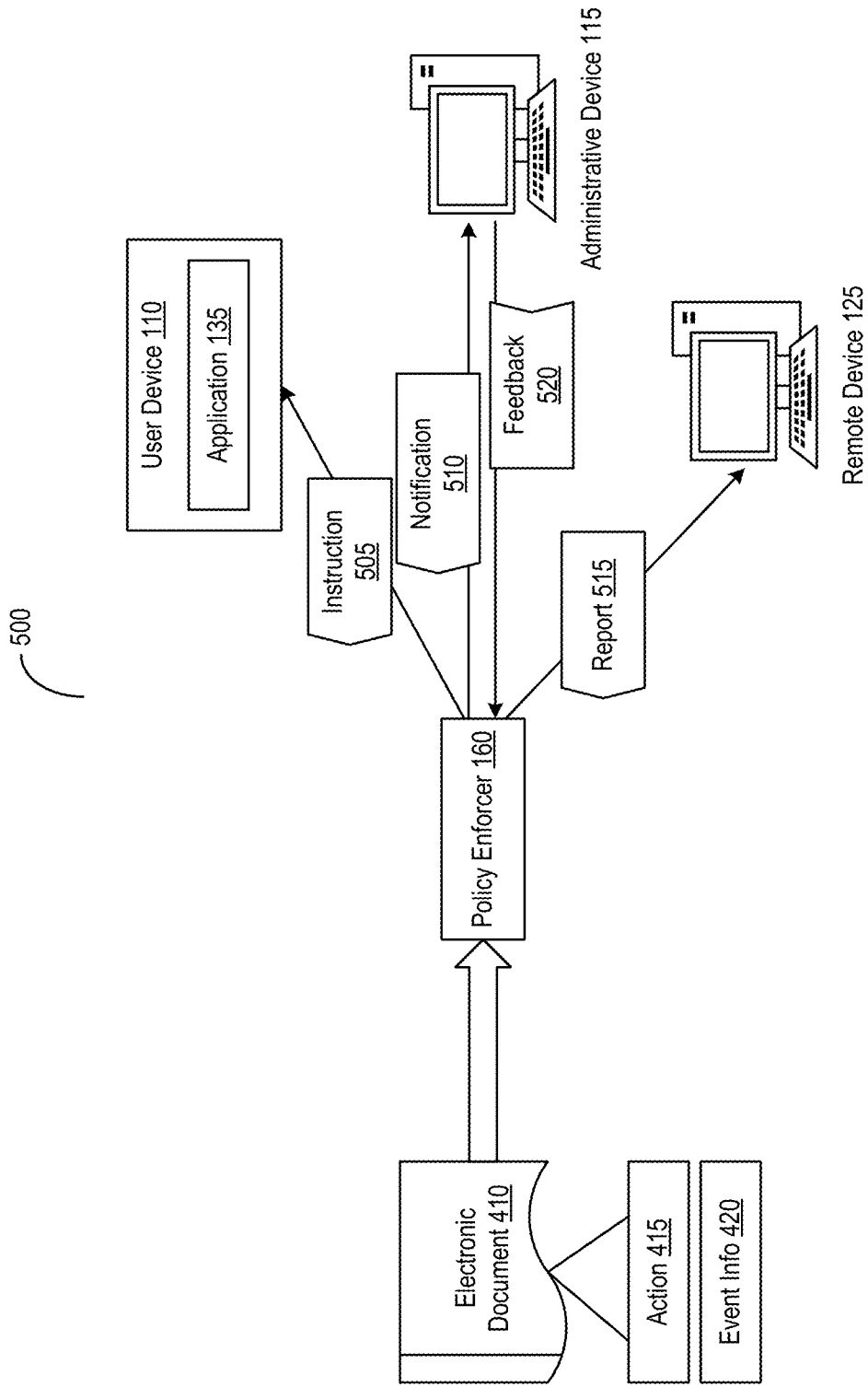
FIG. 5 depicts a block diagram for a process to enforce policies to carry out actions in the system for executing actions for events, in accordance with an illustrative embodiment.

FIG. 5 depicts a block diagram for a process 500 to enforce policies to carry out actions in the system 100 for executing actions for events. The process 500 may include or correspond to operations in the system 100 to execute actions using data from reports. Under the process 500, the policy enforcer 160 executing on the application monitoring service 105 may perform, carry out, or otherwise execute at least one action using the data for the electronic document 410. The policy enforcer 160 may execute the action 415 in accordance with the specifications of the electronic document 410. In some embodiments, the policy enforcer 160 may identify or select the action 415 to perform from the set of actions in accordance with the data of the electronic document 410.

To select, the policy enforcer 160 may parse the electronic document 410 to extract or identify the action 415 from the contents of the electronic document 410. The policy enforcer 160 may use a natural language processing (NLP) algorithm to parse, such as a regular expression template, named entity expression, lexical analyzer, or pattern matching, among others. For instance, the policy enforcer 160 may use the regular expression template to identify for fixed string "recommended action" followed by the specified action 415, such as "turn down application brightness." With the selection, the policy enforcer 160 may perform the action 415. The performance of the action 415 may be automatic (e.g., without approval) or may be in response to approval (e.g., acceptance by the system administrator for the application 135).

When the action 415 is to terminate the use of the application 135, the policy enforcer 160 may generate at least one instruction 505 to terminate the use of the application 135 on the user device 110. The instruction 505 may specify that the user device 110 is to restrict or disable the application 135 from running on the user device 110 or to uninstall the application 135 from the user device 110. The instruction 505 may identify the instance of the application 135, the user device 110, or the user of the user device 110, among others. Upon generation, the policy enforcer 160 may send, transmit, or provide the instruction 505 to the user device 110. With receipt, the user device 110 may cease, close out, or otherwise terminate the use of the application 135 on the user device 110.

When the action 415 is to modify a particular function of the application 135, the policy enforcer 160 may generate the instruction 505 to alter, change, or otherwise modify the function of the application 135 as specified by the action 415. The instruction 505 may specify that the application 135 is to change the operations of the specific function on the application 135. The modifications may include, for example, changing an order of presentation of user interfaces (or screens), moving a location of a user interface element within a user interface, altering a time at which a particular function is run by the application 135, among others. Upon generation, the policy enforcer 160 may send, transmit, or provide the instruction 505 to the user device 110. With receipt, the user device 110 may modify the function of the application 135 in accordance with the instruction 505.

When the action 415 is to restrict the particular function of the application 135, the policy enforcer 160 may generate the instruction 505 to disable, deactivate, or restrict the function of the application 135 as specified by the action 415. The instruction 505 may specify that the application 135 is to disable, prevent, or restrict the specified function from running. For example, the instruction 505 may be to disable a particular lesson to be presented via the application 135, deactivate a function to retrieve particular information, or restrict access to a function during a given period of time (e.g., during the afternoon), among others. Upon generation, the policy enforcer 160 may send, transmit, or provide the instruction 505 to the user device 110. With receipt, the user device 110 may restrict the function of the application 135 in accordance with the instruction 505.

When the action 415 is to send a notification to present to the user, the policy enforcer 160 may generate the instruction 505 to present at least a portion of the electronic document 410. The instruction 505 may include the one or more recommendations of the electronic document 410, as well as diagnostics or analytics information, among others. The instruction 505 may specify which of the user of the application 135, the user device 110, or the support device 120 for the application 135 is to receive and be presented with the notification. Upon generation, the policy enforcer 160 may send, transmit, or provide the instruction 505 to the user device 110 (or the support device 120) accordingly. With receipt, the user device 110 (or the support device 120) may display, render, or otherwise present the notification. For instance, the user device 110 may present a message box within the user interface of the application 135 to provide a step-by-step guide through a lesson also presented through the application 135.

Figure 6:
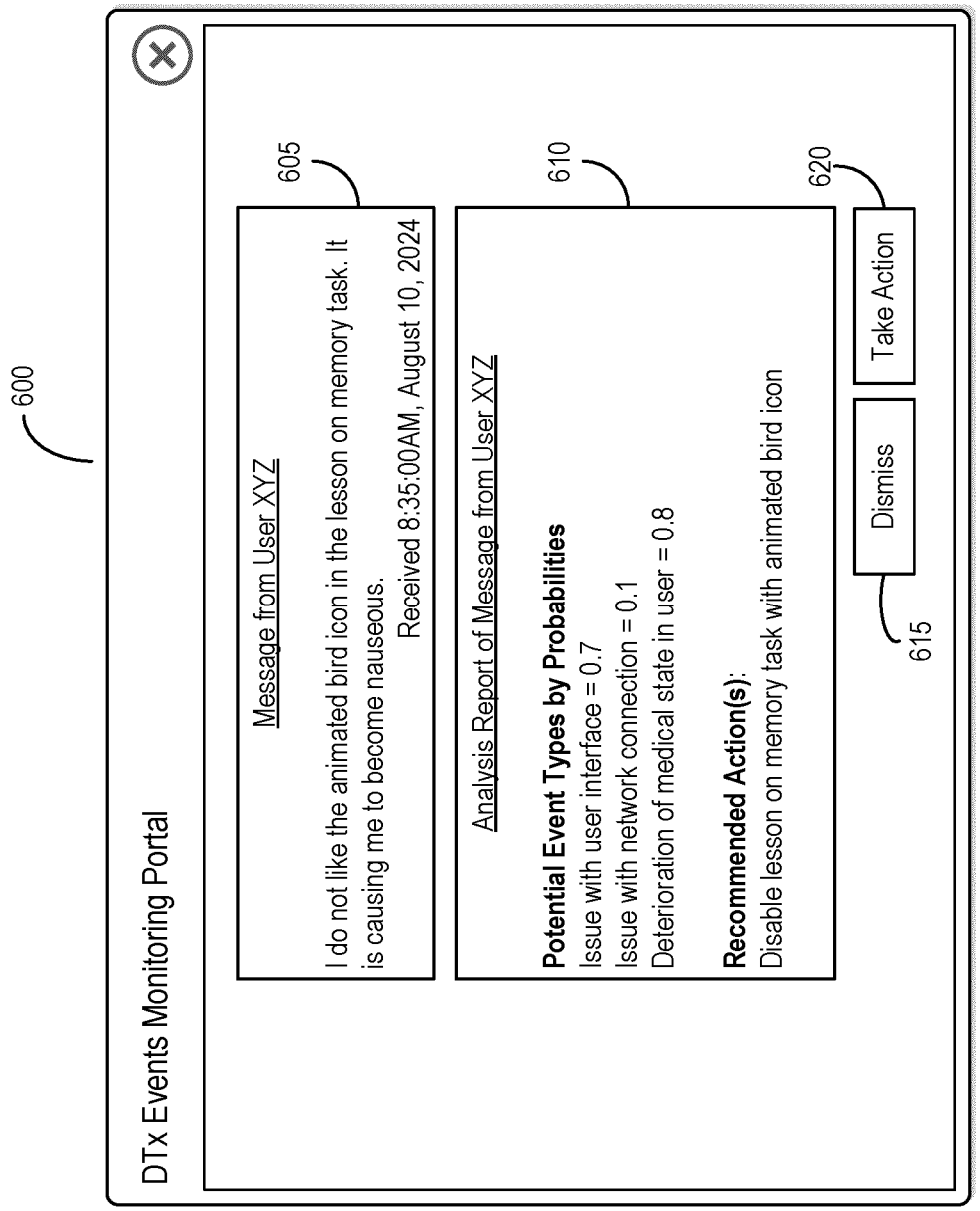
FIG. 6 depicts an example user interface for presenting user messages and analytics reports on events in the system for executing actions for events, in accordance with an illustrative embodiment.

When the action 415 is to provide a report to the administrative device 115, the policy enforcer 160 may generate at least one notification 510. The notification 510 may include at least a portion of the electronic document 410, such as the action 415, the event information 420 (e.g., diagnostics or analytics), or the recommendations, among others. The notification 510 may also include the original free text 305 and at least a portion of the data element 335, such as the value 320, the event type 325, and the message data 330, among others. Upon generation, the policy enforcer 160 may send, transmit, or otherwise provide the notification 510 to the administrative device 115. With receipt, the administrative device 115 may render, display, or otherwise present the notification 510. Using the information of the notification 510, the system administrator may determine which corrective actions to take to address occurrences of events across one or more instances of the application 135. An example of the display of the notification 510 via a user interface on the administrative device 115 is depicted in FIG. 6.

When the action 415 is to provide a report to the remote device 125, the policy enforcer 160 may generate at least one report 515. The report 515 may be to notify or inform another entity other than the entity administering or managing the operations of the application 135. The report 515 may include at least a portion of the electronic document 410, such as the event information 420 (e.g., diagnostics or analytics), among others. In some embodiments, the policy enforcer 160 may determine whether to send the report 515 to the remote device 125 based on a reporting criterion. The reporting criterion may identify or define conditions under which the report 515 (using at least a portion of the electronic document 410) is to be provided to the remote device 125. For instance, the reporting criterion may specify that if the event type 325 for the event is a serious adverse event, the corresponding report 515 is to be sent to the remote device 125.

In determining, the policy enforcer 160 may identify or determine whether the event (or the event type 325 or other data) satisfies the reporting criterion. If the event satisfies the reporting criterion, the policy enforcer 160 may transmit, provide, or otherwise send the report 515 to the remote device 125. Otherwise, if the event does not satisfy the reporting criterion, the policy enforcer 160 may refrain from sending the report 515 to the remote device 125. In some embodiments, the policy enforcer 160 may send the report 515 to the remote device 125, independent of the reporting criterion. For instance, if the action 415 specifies is to provide a report to the remote device 125, the policy enforcer 160 may generate and send the report 515 to the remote device 125. Upon receipt, the remote device 125 may store and maintain the report 515 on a data repository. The remote device 125 may also display, render, or otherwise present the report 515 via a user interface.

When the action 415 is to store the report, the policy enforcer 160 may store and maintain the electronic document 410 on the database 185. The electronic document 410 may be stored with an association with the user, the user device 110, the application 135, or the free text 305, among others. The electronic document 410 may be maintained on the database 185 using any type of data structure, such as a table, a matrix, an array, a linked list, a tree, or a heap, among others. The policy enforcer 160 may store the electronic document 410 for record keeping purposes on the database 185. The electronic documents 410 may be retrieved later (e.g., by the system administrator) for diagnostics or analytics of the application 135. In some embodiments, the policy enforcer 160 may store and maintain the electronic document 410 to be later transmitted to the remote device 125. For instance, the policy enforcer 160 may store the electronic documents 410 for various events, and upon request, send the electronic documents 410 in bulk to the remote device 125 as part of a reporting procedure.

In some embodiments, the policy enforcer 160 may retrieve, identify, or otherwise receive feedback 520 associated with the electronic document 410. The feedback 520 may be received via a user interface. For example, the user interface may be used to present the notification 510 (including parts of the electronic document 410) and to receive inputs for the feedback 520 on the administrative device 115. In some embodiments, the feedback 520 may define or identify an updated value indicating a likelihood of the occurrence of the event associated with the use of the application 135. In some embodiments, the feedback 520 may identify a corrected event type for the event associated with the use of the application 135.

Based on the feedback 520, the policy enforcer 160 may modify, change, or otherwise update one or more of the set of weights of the ML architecture 165. The updating of the weights may be similar to the updating of the weights as part of the training in the process 200 detailed herein. For example, the policy enforcer 160 (or the model trainer 140) may calculate, generate, or otherwise at least one loss metric based on a comparison between the output value 320 and the feedback 520. The loss metric may indicate a degree of deviation of the value 320 relative to the feedback 520. The loss metric may be generated in accordance with any number of loss functions, such as any number of loss functions, such as a norm loss (e.g., L1 or L2), mean absolute error (MAE), mean squared error (MSE), a quadratic loss, a cross-entropy loss, and a Huber loss, among others. Using the loss metric, the model trainer 140 may modify, change, or otherwise update at least one parameters of the classifier model 180.

In this manner, the application monitoring service 105 can provide for the processing of the free text 305 to detect events occurring during the use of the application. The application monitoring service 105 can detect additional events impacting the performance of the application and the user experience indirectly through the free text 305. As such, the application monitoring service 105 can automatically perform the actions 415 to counter or address the detected event that otherwise would be left undetected with other approaches. The use of the NLP model 175 and the classification model 180 of the ML architecture 165 in conjunction with the generative model 170 can lower the chances of hallucinations in the electronic documents 410 characterizing the events, thus increasing the quality and credibility of the documentation of these detected events. The detection of such events and the performance of the action 415 can drastically improve the performance of the application 135, the user device 110 running the application 135, and the user experience. In the context of digital therapeutics, both these can also enhance the higher adherence rates, leading to better health outcomes, and more successful digital therapeutic interventions.

FIG. 6 depicts an example user interface 600 for presenting user messages and analytics reports on events in the system for executing actions for events. The user interface 600 may correspond to a graphical user interface presented via the administrative device 115. The user interface 600 may include any number of user interface elements, such as a message element 605, a report element 610, a dismissal element 615, and an approval element 620, among others. The message element 605 may include the free text inputted by the user "XYZ." The free text may have been received as part of an email to a support line, and may indicate the user's experience (e.g., becoming "nauseous") with a particular user interface element in the application 135 (e.g., the "animated bird icon").

The report element 610 may display portions of an electronic document 410 generated by the generative model 170. The report element 610 may include a list of potential event type classifications along with their respective probabilities of occurrence. Each potential event type 325 (e.g., issues with user interface, network connection, or deterioration in medical condition) may be correspond to one of the event type classifications from the output of the ML architecture 165. Each probability may correspond to the values indicating likelihood taken from the output of the ML architecture 165. The report element 610 may also include one or more actions to be taken to address or remedy the event associated with the use of the application 135. In addition, on the user interface 600, the dismissal element 615 may be used by the system administrator to take no action regarding the detected event. Upon interaction with the dismissal element 615, the policy enforcer 160 can refrain from carrying out the action. The approval element 620 may be used by the system administrator to carry out the recommended action. Upon interaction with the approval element 620, the policy enforcer 160 can perform the action.

Figure 7:
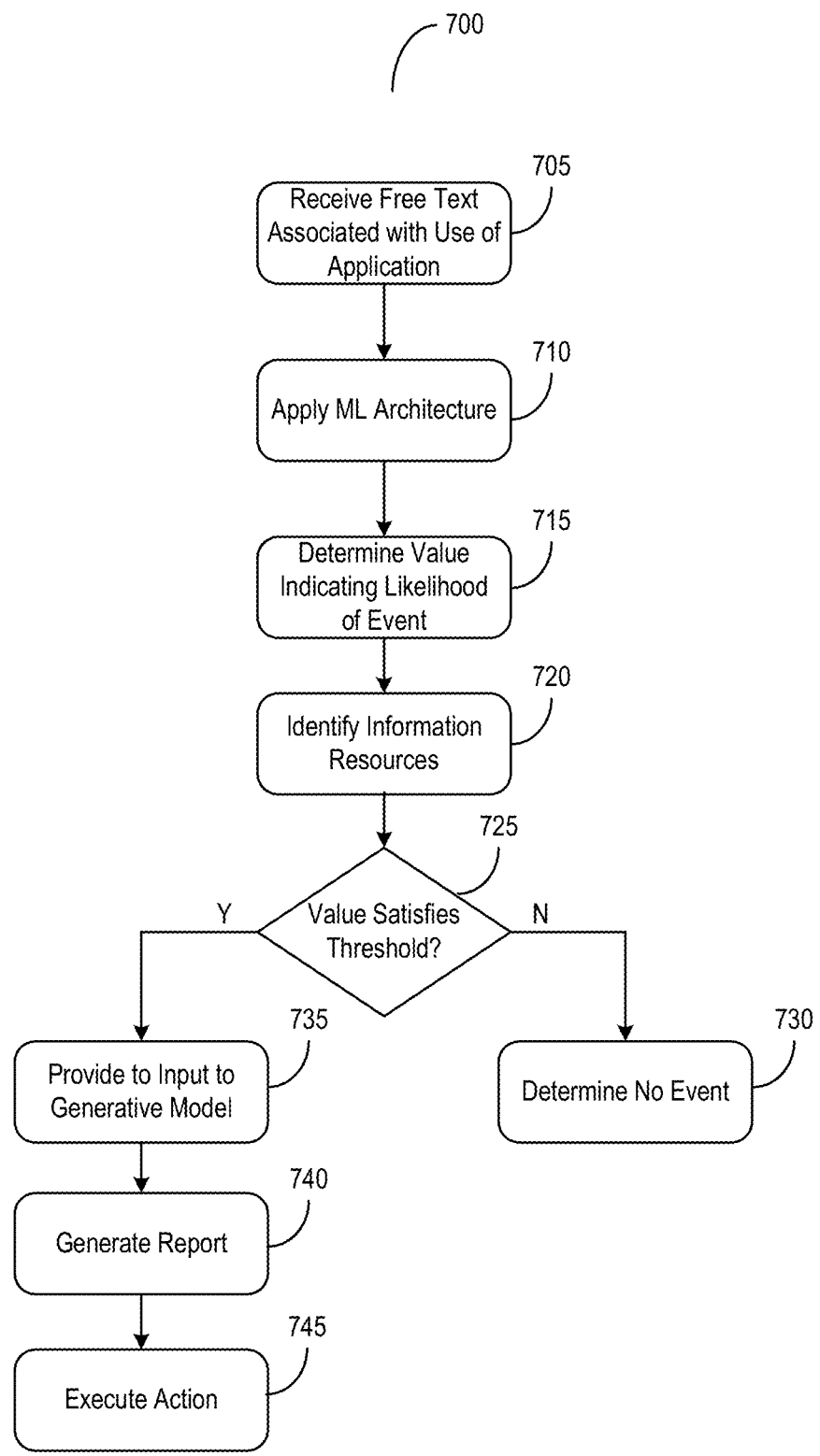
FIG. 7 depicts a flow diagram of a method of executing actions for events associated with use of applications detected from free text data, in accordance with an illustrative embodiment.

FIG. 7 depicts a flow diagram of a method 700 of executing actions for events associated with use of applications detected from free text data. The method 700 can be implemented or performed using any of the components detailed herein such as the application monitoring service 105 or system 800, among others. Under the method 700, a computing system may receive free text associated with a user of an application (705). The computing system may apply a machine learning (ML) architecture to the free text (710). The computing system may determine a value of likelihood of an event based on applying the ML architecture to the free text (715). The computing system may identify an information resources using at least a portion of the free text (720). The computing system may determine whether the value satisfies a threshold (725). If the value does not satisfy (e.g., less than) threshold, the computing system may determine an absence of the event (730). On the other hand, If the value satisfies (e.g., greater than or equal to) threshold, the computing system may provide an input based on the value and the information resource to a generative model (735). The computing system may generate a report from applying the input to the generative model (740). The computing system may execute an action using data from the report (745).

B. Network and Computing Environment

Figure 8:
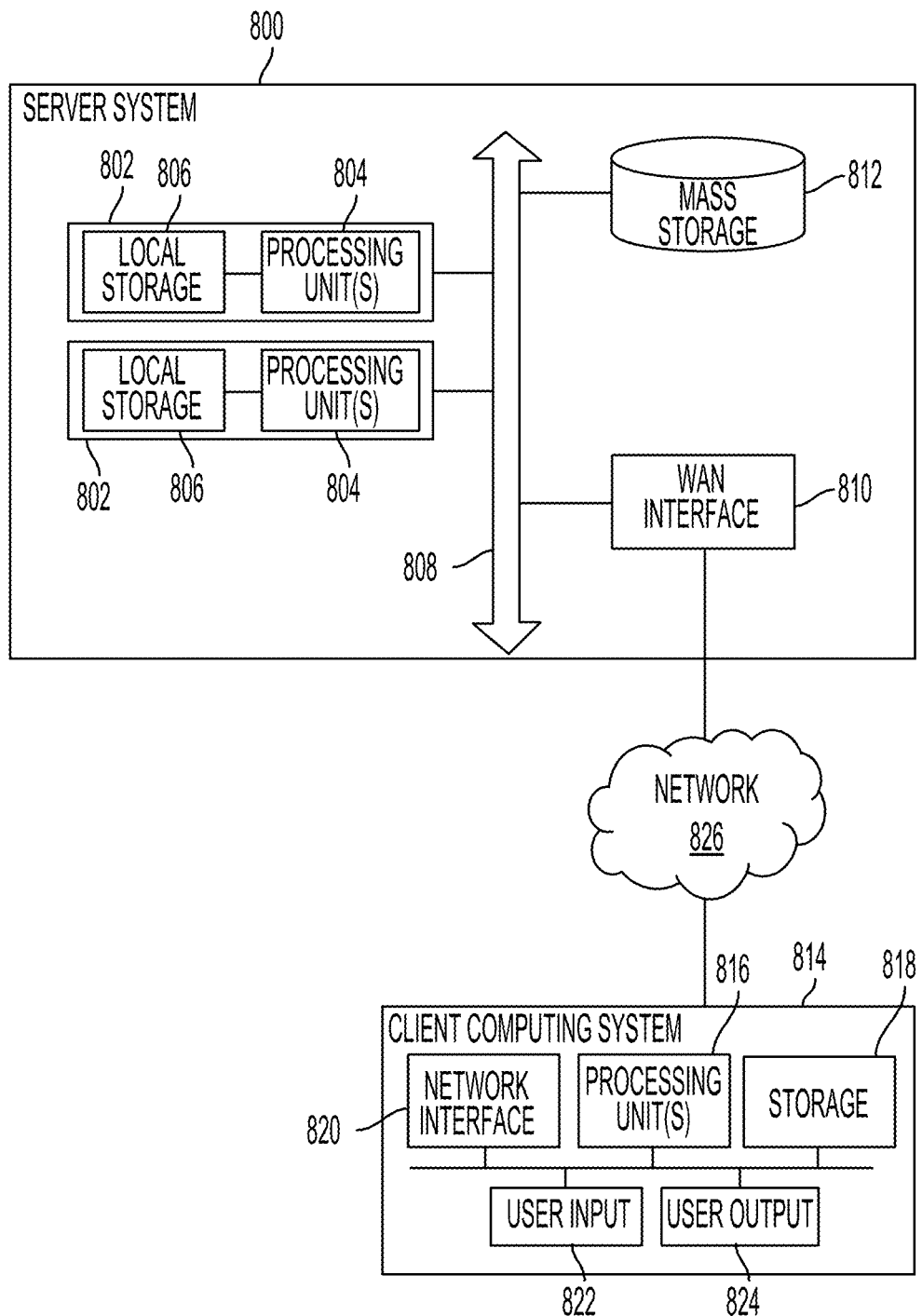
FIG. 8 is a block diagram of a server system and a client computer system in accordance with an illustrative embodiment.

Various operations described herein can be implemented on computer systems. FIG. 8 shows a simplified block diagram of a representative server system 800, client computing system 814, and network 826 usable to implement certain embodiments of the present disclosure. In various embodiments, server system 800 or similar systems can implement services or servers described herein or portions thereof. Client computing system 814 or similar systems can implement clients described herein. The system 100 described herein can be like the server system 800. Server system 800 can have a modular design that incorporates a number of modules 802 (e.g., blades in a blade server embodiment); while two modules 802 are shown, any number can be provided. Each module 802 can include processing unit(s) 804 and local storage 806.

Processing unit(s) 804 can include a single processor, which can have one or more cores, or multiple processors. In some embodiments, processing unit(s) 804 can include a general-purpose primary processor as well as one or more special-purpose co-processors, such as graphics processors, digital signal processors, or the like. In some embodiments, some or all processing units 804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 804 can execute instructions stored in local storage 806. Any type of processors in any combination can be included in processing unit(s) 804.

Local storage 806 can include volatile storage media (e.g., DRAM, SRAM, SDRAM, or the like) and/or non-volatile storage media (e.g., magnetic, or optical disk, flash memory, or the like). Storage media incorporated in local storage 806 can be fixed, removable, or upgradeable as desired. Local storage 806 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 804 need at runtime. The ROM can store static data and instructions that are needed by processing unit(s) 804. The permanent storage device can be a non-volatile read-and-write memory device that can store instructions and data even when module 802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 806 can store one or more software programs to be executed by processing unit(s) 804, such as an operating system and/or programs implementing various server functions such as functions of the system 100 or any other system described herein, or any other server(s) associated with system 100 or any other system described herein.

"Software" refers generally to sequences of instructions that, when executed by processing unit(s) 804, cause server system 800 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 804. Software can be implemented as a single program or a collection of separate programs or program modules that interact as desired. From local storage 806 (or non-local storage described below), processing unit(s) 804 can retrieve program instructions to execute and data to process to execute various operations described above.

In some server systems 800, multiple modules 802 can be interconnected via a bus or other interconnect 808, forming a local area network that supports communication between modules 802 and other components of server system 800. Interconnect 808 can be implemented using various technologies, including server racks, hubs, routers, etc.

A wide area network (WAN) interface 810 can provide data communication capability between the local area network (e.g., through the interconnect 808) and the network 826, such as the Internet. Other technologies can be used to communicatively couple the server system 800 with the network 826, including wired (e.g., Ethernet, IEEE 802.3 standards) and/or wireless technologies (e.g., Wi-Fi, IEEE 802.11 standards).

In some embodiments, local storage 806 is intended to provide working memory for processing unit(s) 804, providing fast access to programs and/or data to be processed while reducing traffic on interconnect 808. Storage for larger quantities of data can be provided on the local area network by one or more mass storage subsystems 812 that can be connected to interconnect 808. Mass storage subsystem 812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 812. In some embodiments, additional data storage resources may be accessible via WAN interface 810 (potentially with increased latency).

Server system 800 can operate in response to requests received via WAN interface 810. For example, one of modules 802 can implement a supervisory function and assign discrete tasks to other modules 802 in response to received requests. Work allocation techniques can be used. As requests are processed, results can be returned to the requester via WAN interface 810. Such operation can generally be automated. Further, in some embodiments, WAN interface 810 can connect multiple server systems 800 to each other, providing scalable systems capable of managing high volumes of activity. Other techniques for managing server systems and server farms (collections of server systems that cooperate) can be used, including dynamic resource allocation and reallocation.

Server system 800 can interact with various user-owned or user-operated devices via a wide-area network such as the Internet. An example of a user-operated device is shown in FIG. 8 as client computing system 814. Client computing system 814 can be implemented, for example, as a consumer device such as a smartphone, other mobile phone, tablet computer, wearable computing device (e.g., smart watch, eyeglasses), desktop computer, laptop computer, and so on. For example, client computing system 814 can communicate via WAN interface 810. Client computing system 814 can include computer components such as processing unit(s) 816, storage device 818, network interface 820, user input device 822, and user output device 824. Client computing system 814 can be a computing device implemented in a variety of form factors, such as a desktop computer, laptop computer, tablet computer, smartphone, other mobile computing device, wearable computing device, or the like.

Processing unit 816 and storage device 818 can be similar to processing unit(s) 804 and local storage 806 described above. Suitable devices can be selected based on the demands to be placed on client computing system 814; for example, client computing system 814 can be implemented as a "thin" client with limited processing capability or as a high-powered computing device. Client computing system 814 can be provisioned with program code executable by processing unit(s) 816 to enable various interactions with server system 800.

Network interface 820 can provide a connection to the network 826, such as a wide area network (e.g., the Internet) to which WAN interface 810 of server system 800 is also connected. In various embodiments, network interface 820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 822 can include any device (or devices) via which a user can provide signals to client computing system 814; client computing system 814 can interpret the signals as indicative of user requests or information. In various embodiments, user input device 822 can include at least one of a keyboard, touch pad, touch screen, mouse, or other pointing device, scroll wheel, click wheel, dial, button, switch, keypad, microphone, and so on.

User output device 824 can include any device via which client computing system 814 can provide information to a user. For example, user output device 824 can include display-to-display images generated by or delivered to client computing system 814. The display can incorporate various image generation technologies, e.g., a liquid crystal display (LCD), light-emitting diode (LED) display including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 824 can be provided in addition to or instead of a display. Examples include indicator lights, speakers, tactile "display" devices, printers, and so on.

Some embodiments include electronic components, such as microprocessors, storage, and memory that store computer program instructions in a computer readable storage medium. Many of the features described in this specification can be implemented as processes that are specified as a set of program instructions encoded on a computer readable storage medium. When one or more processing units execute these program instructions, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 804 and 816 can provide various functionality for server system 800 and client computing system 814, including any of the functionality described herein as being performed by a server or client, or other functionality.

It will be appreciated that server system 800 and client computing system 814 are illustrative and that variations and modifications are possible. Computer systems used in connection with embodiments of the present disclosure can have other capabilities not specifically described here. Further, while server system 800 and client computing system 814 are described with reference to particular blocks, it is to be understood that these blocks are defined for convenience of description and are not intended to imply a particular physical arrangement of component parts. For instance, different blocks can be but need not be in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies, including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may refer to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or digital versatile disk (DVD), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method of executing actions for events associated with use of applications, comprising:
    identifying, by one or more processors, free text associated with an application to be evaluated for at least one of a plurality of events associated with a use of the application;
    applying, by the one or more processors, the free text to a machine learning (ML) architecture, the ML architecture trained using a plurality of sample texts indicative of at least one of the plurality of events associated with the use of the application;
    determining, by the one or more processors, based on applying the free text to the ML architecture, a value indicating a likelihood of occurrence of an event associated with the use of the application;
    providing, by the one or more processors, to a generative ML model, a model input based on the free text and the value, to obtain data for an electronic document characterizing the event associated with the use of the application; and
    executing, by the one or more processors, an action using the data for the electronic document.

2. The method of claim 1, wherein applying the free text to the ML architecture further comprises applying the free text to the ML architecture comprising a natural language processing (NLP) model configured to access a plurality of information resources associated with the application.

3. The method of claim 2, wherein determining the value further comprises identifying, based on the applying the free text to the ML architecture, an information resource of the plurality of information resources associated with the application using at least a portion of the free text.

4. The method of claim 2, wherein providing the model input further comprises providing the model input based on an information resource identified from the plurality of information resources associated with the application using at least a portion of the free text, to the generative ML model to obtain the data.

5. The method of claim 1, wherein the ML architecture further comprises a classifier model established using the plurality of sample texts, each of the plurality of sample texts labeled with a respective indication of a presence or an absence of a respective event associated with the use of the application.

6. The method of claim 1, wherein the plurality of events associated with the use of the application comprises at least one of an adverse event, a serious adverse event, an incident, a serious incident, a software bug, a user complaint, or a usability issue.

7. The method of claim 1, wherein determining the value further comprises classifying, based on applying the free text to the ML architecture, the event as at least one of an adverse event, a serious adverse event, an incident, a serious incident, a software bug, a user complaint, or a usability issue.

8. The method of claim 1, wherein executing the action further comprises:
    determining that the event satisfies a reporting criterion to provide at least a portion of the electronic document to a remote device, and
    sending, to the remote device, at least the portion of the electronic document in response to determining that the event satisfies the reporting criterion.

9. The method of claim 1, wherein the generative ML model is trained using at least one corpus comprising a sample input and a sample output, wherein the sample input identifies at least one of (i) a sample information resource associated with at least one event of the plurality of events or (ii) a sample value indicating likelihood of the at least one event, and wherein the sample output identifies at least one of: (i) a diagnosis of the at least one event, (ii) a sample action for the at least one event, or (iii) analytics for the at least one event.

10. The method of claim 1, wherein executing the action for the event further comprises selecting the action from a plurality of actions in accordance with the data, the plurality of actions including at least one of: (i) terminating use of the application on a user device associated with the user, (ii) restricting an operation of the application associated with the event, (iii) sending a notification to the user device for presentation to the user, (iv) providing the electronic document to an administrator device, or (v) storing the electronic document.

11. The method of claim 1, further comprising determining, by the or more processors, that the value indicating the likelihood of the event satisfies a threshold, and
    wherein providing the model input further comprises providing the model input to the generative ML model, responsive to determining the value satisfies the threshold.

12. The method of claim 1, further comprising:
    receiving, by the one or more processors, via an interface, feedback identifying an updated value indicating an updated likelihood of the event associated with the application; and
    updating, by the one or more processors, at least one of a plurality of weights of the ML architecture based on the feedback.

13. The method of claim 1, further comprising generating, by the one or more processors, the model input to include context information based on the free text and the value, in accordance with a template.

14. The method of claim 1, wherein identifying the free text further comprises obtaining the free text associated with the application from at least one of: (i) an email, (ii) a text message, (iii) a voice transcript, (iv) a chatbot message, (v) an electronic post, or (vi) a communication platform message.

15. The method of claim 1, wherein identifying the free text further comprises:
    establishing an event listener on the application to monitor for the free text generated by a user of the application, and
    obtaining, via an application programming interface (API) of the event listener of the application, the free text.

16. The method of claim 1, wherein determining the value further comprises generating a data element identifying (i) an information resource associated with the application, (ii) the value, and (iii) a timestamp associated with a message including the free text.

17. The method of claim 1, wherein providing the model input further comprises generating, based on providing the model input to the generative ML model, the electronic document including one or more recommendations for the event.

18. The method of claim 1, wherein the application includes a digital therapeutic application, and wherein a user is administered with an effective amount of a medication to address a condition, concurrently with use of the digital therapeutic application.

19. A system for events associated with use of applications, comprising:
one or more processors coupled with memory, the one or more processors configured to:
identify free text associated with an application to be evaluated for at least one of a plurality of events associated with a use of the application;
apply the free text to a machine learning (ML) architecture, the ML architecture trained using a plurality of sample texts indicative of at least one of the plurality of events associated with the use of the application;
determine based on applying the free text to the ML architecture, a value indicating a likelihood of occurrence of an event associated with the use of the application;
provide to a generative ML model, a model input based on the free text and the value, to obtain data for an electronic document characterizing the event associated with the use of the application; and
execute an action using the data for the electronic document.

20. The system of claim 19, wherein the one or more processors are configured to apply the free text to the ML architecture comprising a natural language processing (NLP) model configured to access a plurality of information resources associated with the application.

21. The system of claim 20, wherein the one or more processors are configured to identify, based on the applying the free text to the ML architecture, an information resource of the plurality of information resources associated with the application using at least a portion of the free text.

22. The system of claim 20, wherein the one or more processors are configured to provide the model input based on an information resource identified from the plurality of information resources associated with the application using at least a portion of the free text, to the generative ML model to obtain the data.

23. The system of claim 19, wherein the ML architecture further comprises a classifier model established using the plurality of sample texts, each of the plurality of sample texts labeled with a respective indication of a presence or an absence of a respective event associated with the use of the application.

24. The system of claim 19, wherein the one or more processors are configured to classify, based on applying the free text to the ML architecture, the event as at least one of an adverse event, a serious adverse event, an incident, a serious incident, a software bug, a user complaint, or a usability issue.

25. The system of claim 19, wherein the one or more processors are configured to:
determine that the event satisfies a reporting criterion to provide at least a portion of the electronic document to a remote device, and
send, to the remote device, at least the portion of the electronic document in response to determining that the event satisfies the reporting criterion.

26. The system of claim 19, wherein the generative ML model is trained using at least one corpus comprising a sample input and a sample output, wherein the sample input identifies at least one of (i) a sample information resource associated with at least one event of the plurality of events or (ii) a sample value indicating likelihood of the at least one event, and wherein the sample output identifies at least one of: (i) a diagnosis of the at least one event, (ii) a sample action for the at least one event, or (iii) analytics for the at least one event.

27. The system of claim 19, wherein the one or more processors are configured to select the action from a plurality of actions in accordance with the data, the plurality of actions including at least one of: (i) terminating use of the application on a user device associated with the user, (ii) restricting an operation of the application associated with the event, (iii) sending a notification to the user device for presentation to the user, (iv) providing the electronic document to an administrator device, or (v) storing the electronic document.

28. The system of claim 19, the one or more processors are further configured to determine that the value indicating the likelihood of the event satisfies a threshold, and
wherein the one or more processors are configured to provide the model input to the generative ML model, responsive to determining the value satisfies the threshold.

29. The system of claim 19, wherein the one or more processors are configured to obtain the free text associated with the application from at least one of: (i) an email, (ii) a text message, (iii) a voice transcript, (iv) a chatbot message, (v) an electronic post, or (vi) a communication platform message.

30. The system of claim 19, wherein the application includes a digital therapeutic application, and wherein a user is administered with an effective amount of a medication to address a condition, concurrently with use of the digital therapeutic application.

* * * * *